United States Patent
Lee et al.

(10) Patent No.: US 9,628,706 B2
(45) Date of Patent: Apr. 18, 2017

(54) METHOD FOR CAPTURING AND DISPLAYING PREVIEW IMAGE AND ELECTRONIC DEVICE THEREOF

(71) Applicant: Samsung Electronics Co., Ltd., Suwon-si, Gyeonggi-do (KR)

(72) Inventors: Ki-Huk Lee, Yongin-si (KR); Hyun-Jung Kim, Seoul (KR); Cho-Hyang Ma, Yongin-si (KR); Dong-Il Son, Seongnam-si (KR); Heung-Sik Shin, Jeonju-si (KR); Cheol-Ho Cheong, Seoul (KR); In-Ji Jin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 14/211,650

(22) Filed: Mar. 14, 2014

(65) Prior Publication Data
US 2014/0267592 A1 Sep. 18, 2014

(30) Foreign Application Priority Data
Mar. 14, 2013 (KR) ........................ 10-2013-0027489

(51) Int. Cl.
*H04N 5/232* (2006.01)

(52) U.S. Cl.
CPC ..... *H04N 5/23238* (2013.01); *H04N 5/23293* (2013.01)

(58) Field of Classification Search
USPC .......................................................... 348/36
See application file for complete search history.

(56) References Cited

U.S. PATENT DOCUMENTS

| 5,986,670 | A  | * | 11/1999 | Dries ................. G06F 17/5004 345/629 |
| 8,619,152 | B2 | * | 12/2013 | Lee ....................... G01C 21/20 348/222.1 |
| 9,081,418 | B1 | * | 7/2015 | Yao ........................ G06F 3/0304 |
| 9,201,499 | B1 | * | 12/2015 | Chang ..................... G06F 3/011 |
| 2005/0154505 | A1 | * | 7/2005 | Nakamura ........... G01C 21/365 701/1 |
| 2007/0052987 | A1 | * | 3/2007 | Jung ..................... H04N 1/6011 358/1.9 |
| 2007/0098264 | A1 | * | 5/2007 | Van Lier .................. G06K 9/50 382/199 |
| 2010/0229089 | A1 | * | 9/2010 | Narita ................... G06F 3/0416 715/702 |

(Continued)

FOREIGN PATENT DOCUMENTS

KR   10-2012-0074493 A   7/2012

*Primary Examiner* — Paulos M Natnael
(74) *Attorney, Agent, or Firm* — Jefferson IP Law, LLP

(57) ABSTRACT

A method for processing an image using an electronic device is provided. The method includes displaying at least one first object and a first image associated with the at least one first object at a first position on a display unit connected to the electronic device, the at least one first object including information representing a direction of the electronic device, displaying at least one second object and a second image associated with the at least one second object at a second position on the display unit, and capturing at least a portion of the second image when the at least one first object is located within a distance from the at least one second object.

18 Claims, 34 Drawing Sheets

(56) References Cited

U.S. PATENT DOCUMENTS

| | | | |
|---|---|---|---|
| 2011/0128555 A1* | 6/2011 | Rotschild | G02B 27/2271 356/625 |
| 2011/0225538 A1* | 9/2011 | Oyagi | G06F 1/1692 715/781 |
| 2012/0209513 A1* | 8/2012 | Walker | G06K 9/00677 701/431 |
| 2012/0249591 A1* | 10/2012 | Maciocci | G06F 3/011 345/633 |
| 2013/0258122 A1* | 10/2013 | Keane | H04N 5/23267 348/208.4 |
| 2015/0054739 A1* | 2/2015 | Itoh | G09G 5/00 345/156 |
| 2015/0138389 A1* | 5/2015 | Mishra | G06T 7/002 348/222.1 |

* cited by examiner

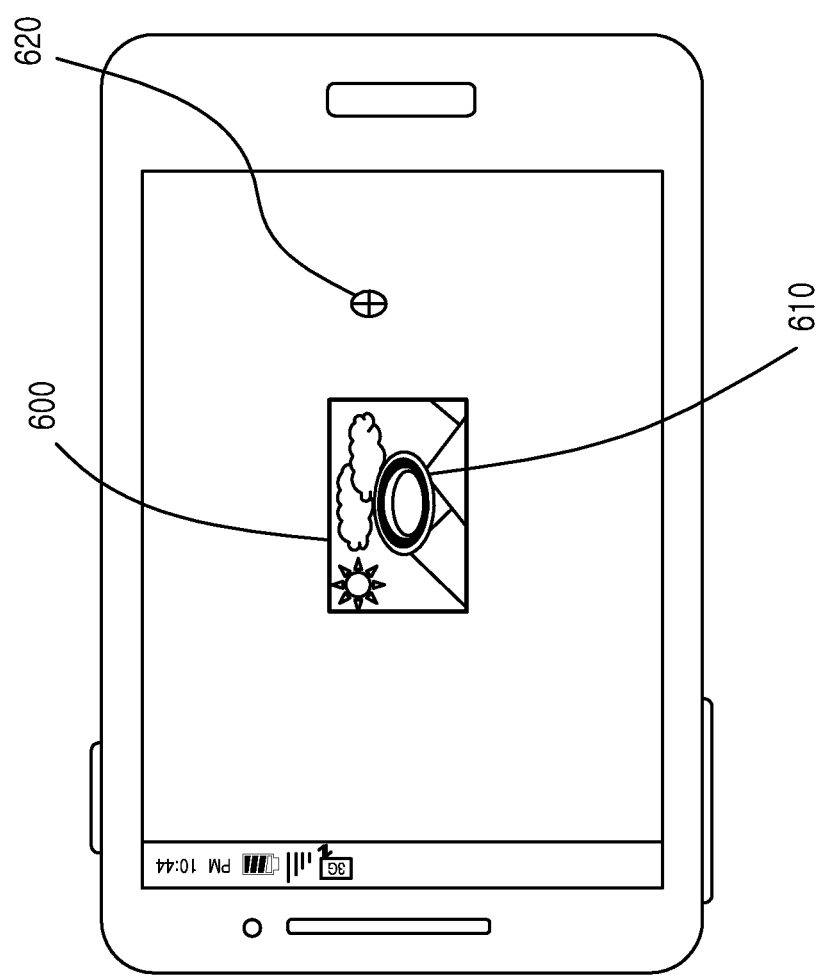

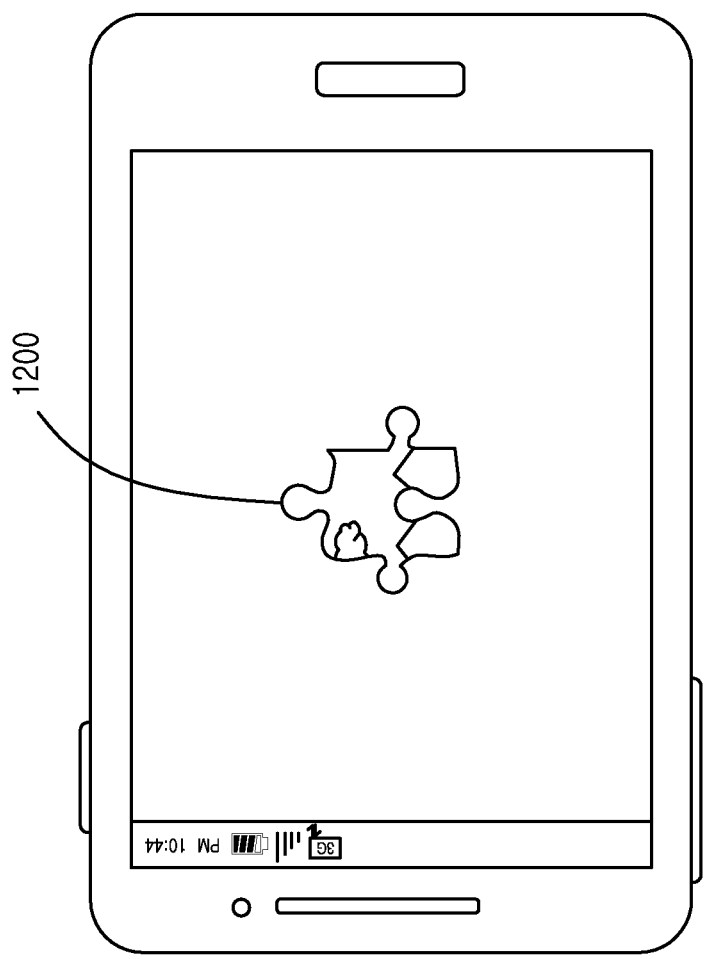

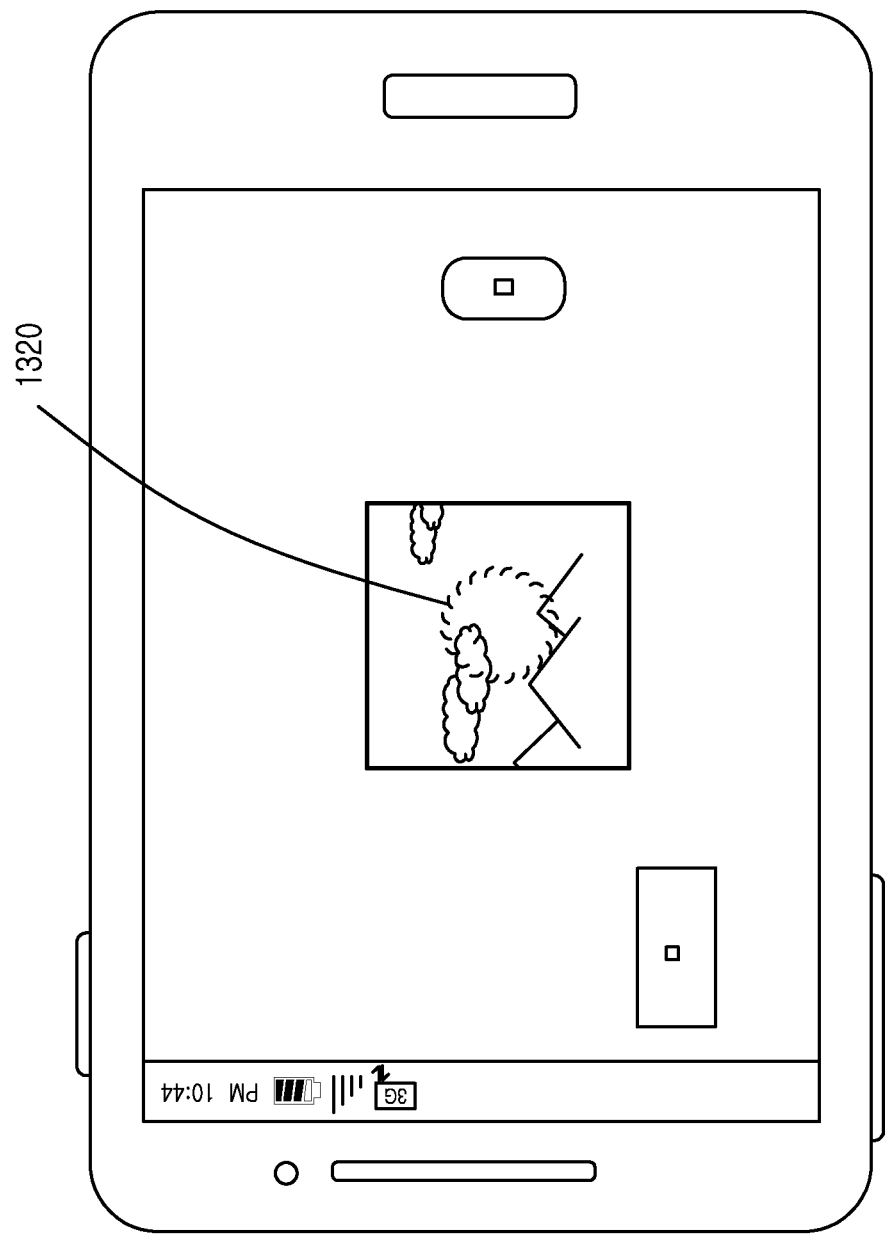

METHOD FOR CAPTURING AND DISPLAYING PREVIEW IMAGE AND ELECTRONIC DEVICE THEREOF

CROSS-REFERENCE TO RELATED APPLICATION(S)

This application claims the benefit under 35 U.S.C. §119(a) of a Korean patent application filed on Mar. 14, 2013 in the Korean Intellectual Property Office and assigned Serial number 10-2013-0027489, the entire disclosure of which is hereby incorporated by reference.

TECHNICAL FIELD

The present disclosure relates to a method for capturing an image and an electronic device thereof.

BACKGROUND

With the development of information communication technology and semiconductor technology, electronic devices have been developed into multimedia devices for providing various multimedia services. For example, portable electronic devices may provide various multimedia services, such as a broadcast service, a wireless Internet service, a camera service, and a music playback service.

Recently, the electronic devices may provide various services by using an image acquired by an image sensor. For example, the electronic device may provide a panoramic image service in which multiple images acquired at multiple capture angles are combined into one panoramic image having a wide range.

When the panoramic image service is provided, a user may need to capture images at multiple capture angles by using an electronic device in order to generate a panoramic image. When the user captures an image at an improper angle or misses capturing an image at a proper angle for a panoramic image, the electronic device may generate an inadequate panoramic image.

Therefore, there is a need for a user interface for generation of a panoramic image for a user's convenience corresponding to a panoramic image service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user interface for generation of a panoramic image in an electronic device.

Another aspect of the present disclosure is to provide an apparatus and a method for displaying information about image capture for a panoramic image in an electronic device.

Another aspect of the present disclosure is to provide an apparatus and a method for displaying information about capture directions of images constituting a panoramic image in an electronic device.

Another aspect of the present disclosure is to provide an apparatus and method for displaying information about a capture position adjacent to a capture direction of an image sensor in an electronic device.

Another aspect of the present disclosure is to provide an apparatus and method for displaying information about an adjacent capture position by using a first object located at the center of a preview image in an electronic device.

Another aspect of the present disclosure is to provide an apparatus and method for displaying information about a number of images which are to be captured for a panoramic image in an electronic device.

Another aspect of the present disclosure is to provide an apparatus and method for displaying information about the number of images which are to be captured in respective capture directions for a panoramic image in an electronic device.

Another aspect of the present disclosure is to provide an apparatus and method for capturing an image in consideration of information about whether a first object, indicating a capture direction of an image sensor, is matched with information about a second object, indicating a capture position.

In accordance with an aspect of the present disclosure, a method in an electronic device is provided. The method includes displaying at least one first object and a first image associated with the at least one first object at a first position on a display unit connected to the electronic device, the at least one first object including information representing a direction of the electronic device, displaying at least one second object and a second image associated with the at least one second object at a second position on the display unit, and capturing at least a portion of the second image when the at least one first object is located within a predetermined area (ex. distance) from the at least one second object.

In accordance with another aspect of the present disclosure, a method in an electronic device is provided. The method includes displaying a first image at a first position on a display unit connected to the electronic device, displaying a second object at a second position on the display unit, and capturing at least a portion of the first image when the first image is located within a predetermined area (ex. distance) from the second object.

In accordance with another aspect of the present disclosure, a method for processing an image using an electronic device is provided. The method includes displaying at least one first object and a first image associated with the at least one first object at a first position on a display unit connected to the electronic device, the at least one first object including information representing a direction of the electronic device, displaying at least one second object at a second position on the display, and capturing at least a portion of a second image associated with the at least one second object when the at least one first object is located within a predetermined area (ex. distance) from the at least one second object.

In accordance with another aspect of the present disclosure, an electronic device is provided. The electronic device includes a display unit configured to display an image, a display control unit configured to control displaying of at least one first object and a first image associated with the at least one first object at a first position on the display unit, and to control displaying of at least one second object and a second image associated with the at least one second object at a second position on the display, the at least one first object including information representing a direction of the electronic device, and a capture control unit configured to capture at least a portion of the second image when the at least one first object is located within a predetermined area (ex. distance) from the at least one second object.

In accordance with another aspect of the present disclosure, an electronic device is provided. The electronic device includes a display unit configured to display an image, a control unit configured to control displaying of a first image at a first position on a display unit connected to the electronic device and to control displaying of a second object at a second position on the display unit, and a capture control unit configured to capture at least a portion of the first image when the first image is located within a predetermined area (ex. distance) from the second object.

In accordance with another aspect of the present disclosure, an electronic device is provided. The electronic device includes a display unit configured to display an image, a display control unit configured to control displaying of at least one first object and a first image associated with the first object at a first position on a display unit connected to the electronic device, and configured to control displaying of at least one second object at a second position on the display, the ate least one first object including information representing a direction of the electronic device, and a capture control unit configured to capture at least a portion of the second image associated with the second object when the first object is located within a predetermined area (ex. distance) from the second object.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are diagrams illustrating a configuration of a screen for displaying guide information for image capture in an electronic device according to a third embodiment of the present disclosure;

FIGS. 12A, 12B, and 12C are diagrams illustrating a configuration of a screen for displaying guide information for image capture in an electronic device according to a ninth embodiment of the present disclosure;

FIGS. 13A, 13B, 13C, 13D, and 13E are diagrams illustrating a configuration of a screen for displaying guide information for image capture in an electronic device according to a tenth embodiment of the present disclosure;

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The present disclosure describes a technology of providing a user interface for a panoramic image in an electronic device.

The electronic device may employ and/or include devices having an image sensor, such as a portable electronic device, a portable terminal, a mobile terminal, a mobile pad, a media player, a Personal Digital Assistant (PDA), a desktop computer, a laptop computer, a smart phone, a netbook computer, a Television (TV), a Mobile Internet Device (MID), an Ultra Mobile PC (UMPC), a tablet PC, a navigation system, a wrist watch, a digital camera, and a Motion Picture Expert Group (MPEG) Audio Layer 3 (MP3) player. The electronic device may be an electronic device combining two or more functions of the above-described devices and may be any other similar and/or suitable electronic device.

In the following description, an image sensor may be also referred to as a camera unit.

Figure 1:
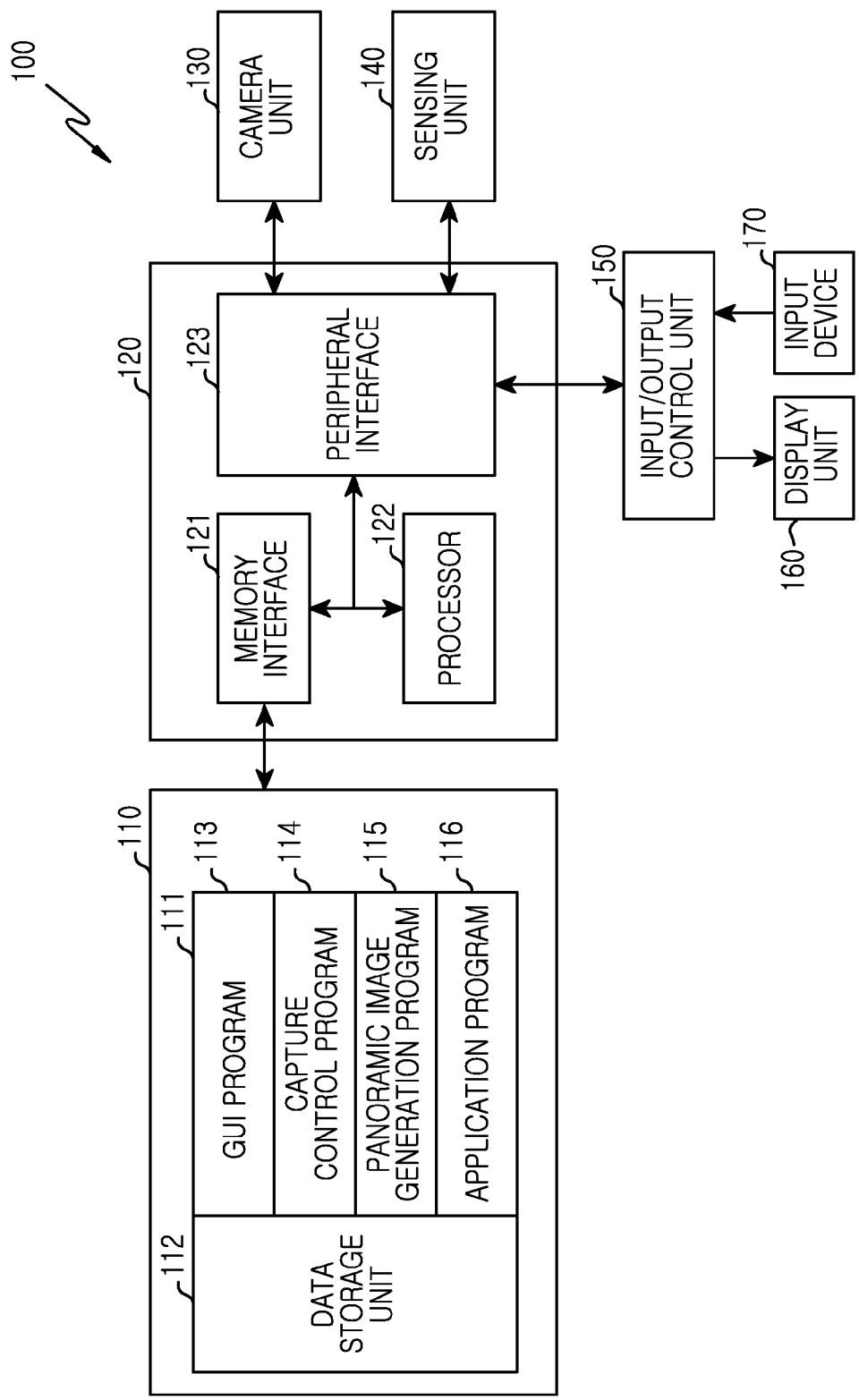
FIG. 1 is a diagram illustrating a block configuration of an electronic device according to an embodiment of the present disclosure.
Figure 4A:
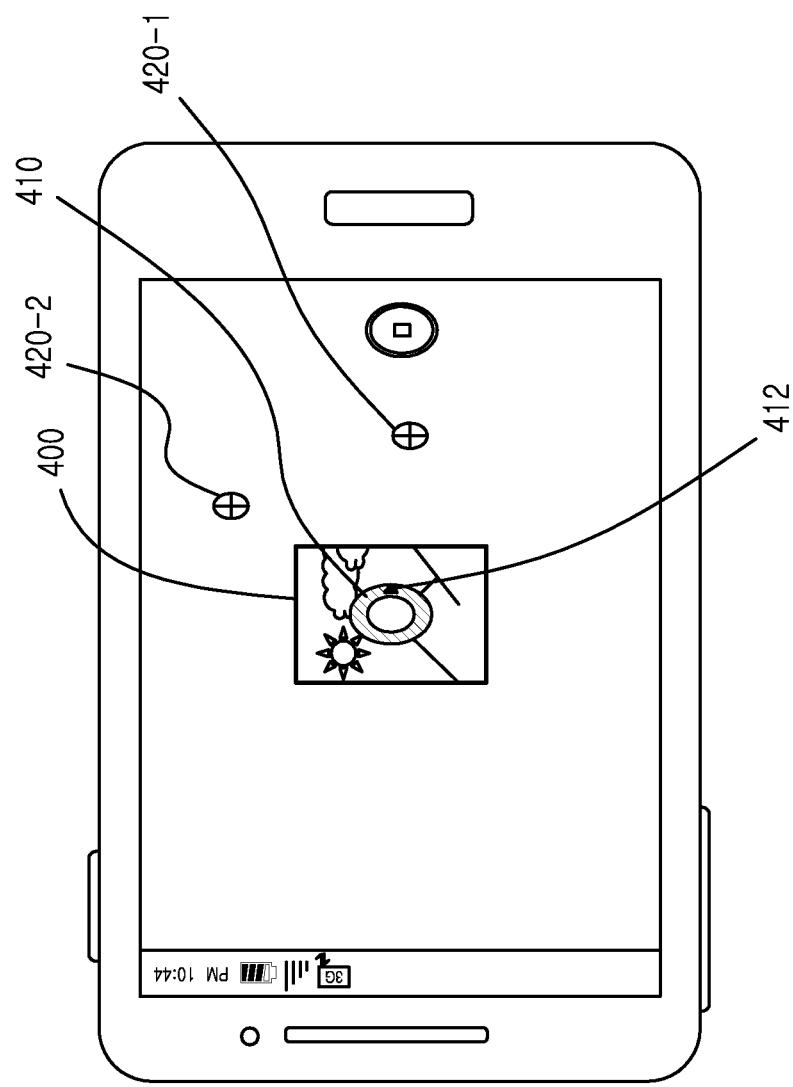
FIGS. 4A and 4B are diagrams illustrating a configuration of a screen for displaying guide information for image capture in an electronic device according to a first embodiment of the present disclosure.
Figure 4B:
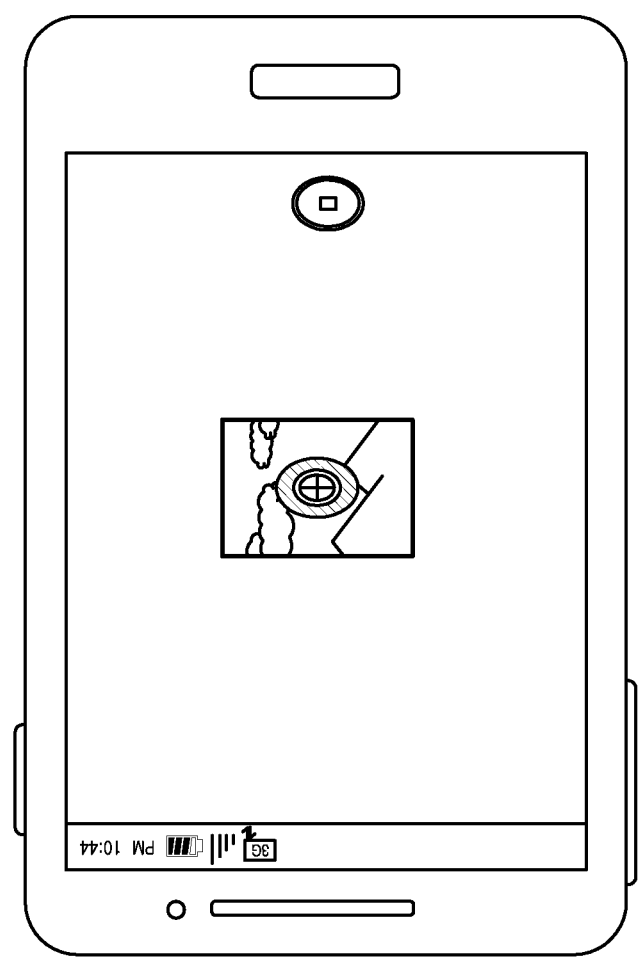
Figure 5A:
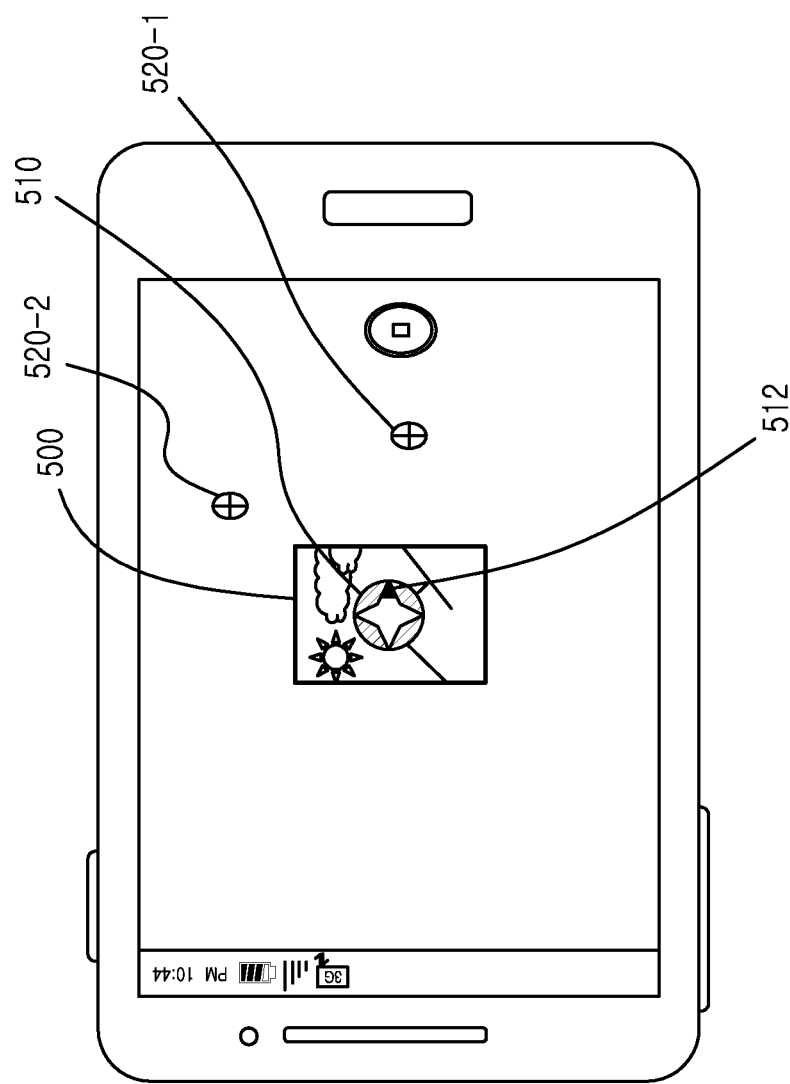
FIGS. 5A and 5B are diagrams illustrating a configuration of a screen for displaying guide information for image capture in an electronic device according to a second embodiment of the present disclosure.
Figure 5B:
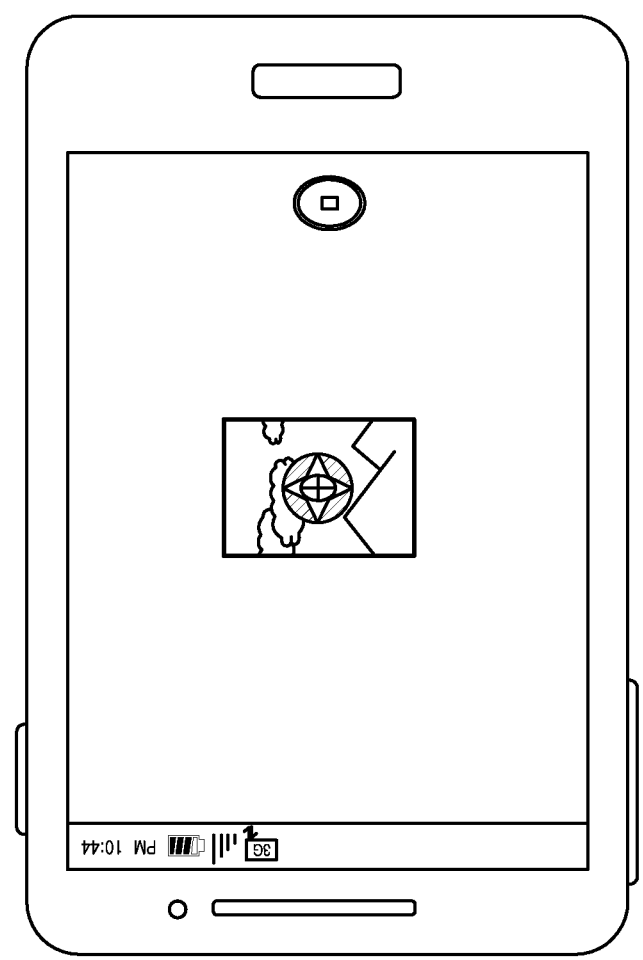
Figure 6B:
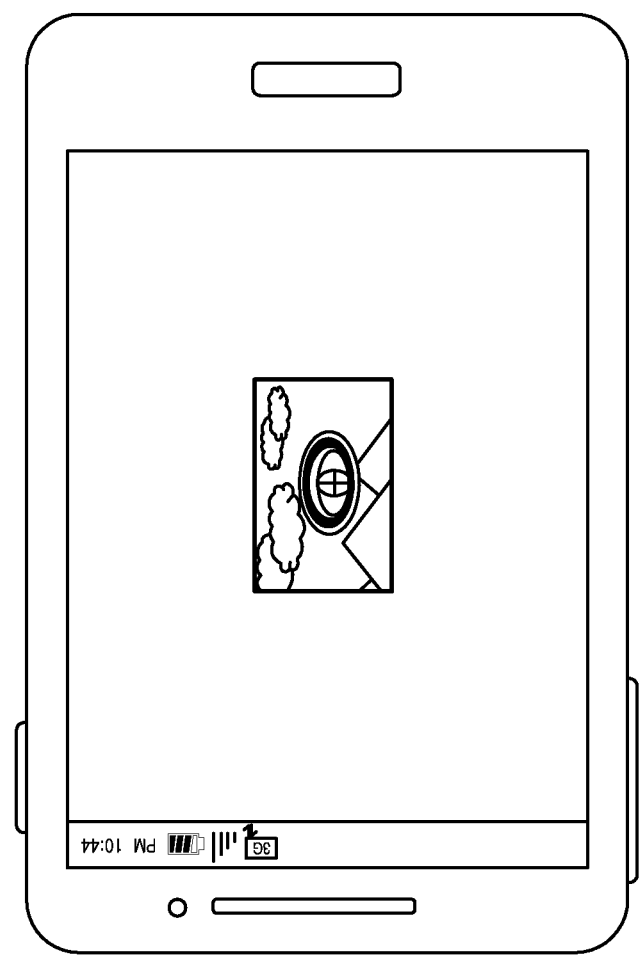
Figure 7A:
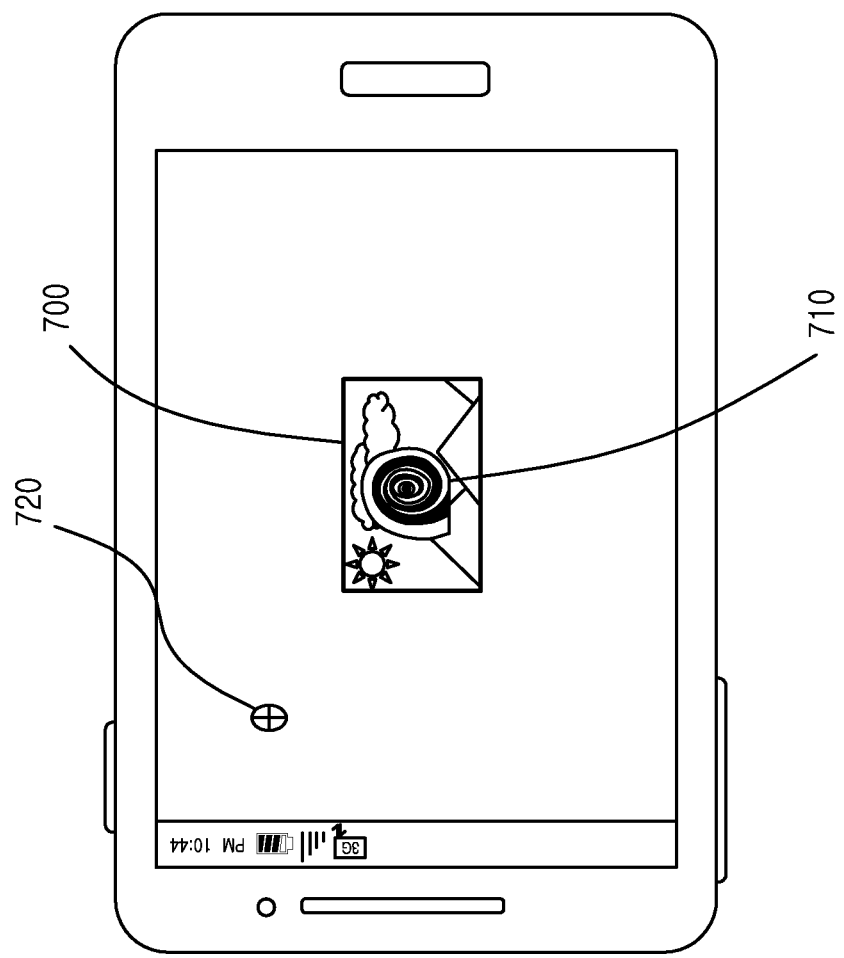
FIGS. 7A and 7B are diagrams illustrating a configuration of a screen for displaying guide information for image capture in an electronic device according to a fourth embodiment of the present disclosure.
Figure 7B:
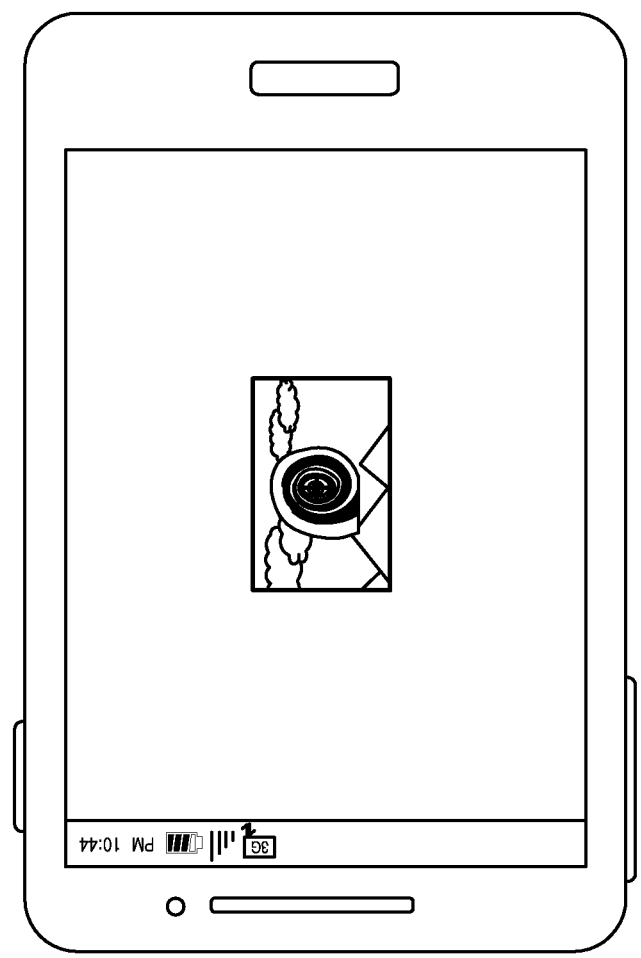
Figure 8A:
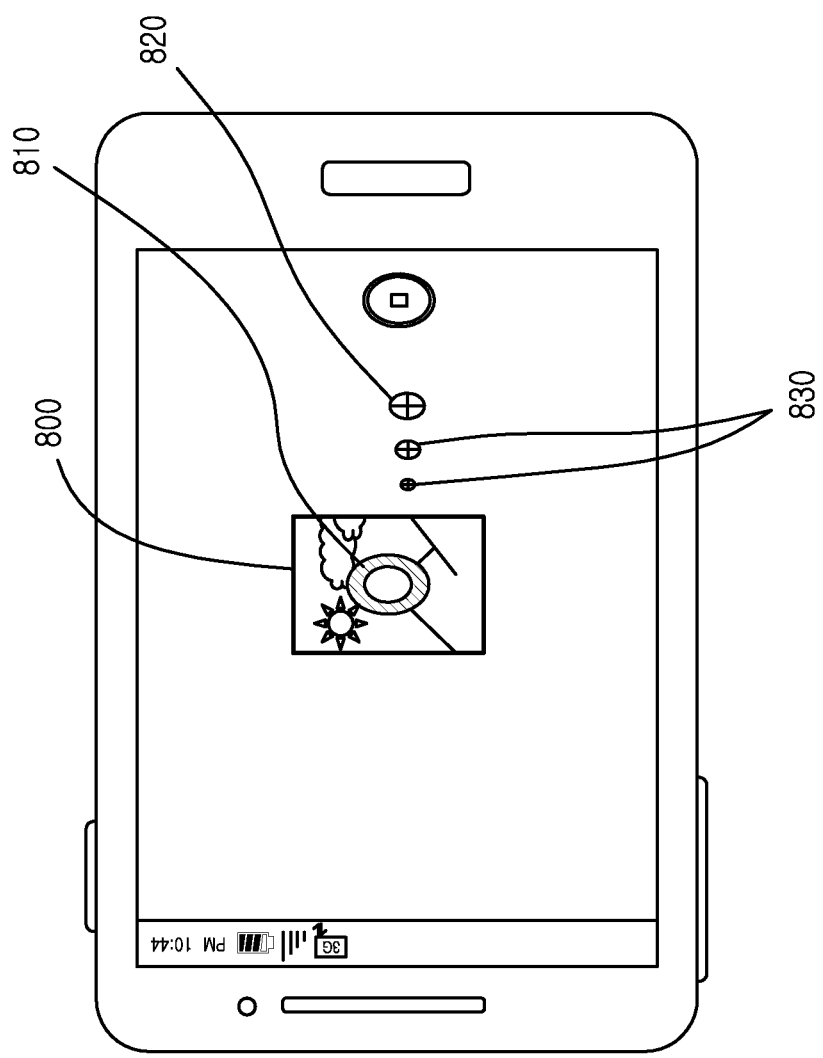
FIGS. 8A and 8B are diagrams illustrating a configuration of a screen for displaying guide information for image capture in an electronic device according to a fifth embodiment of the present disclosure.
Figure 8B:
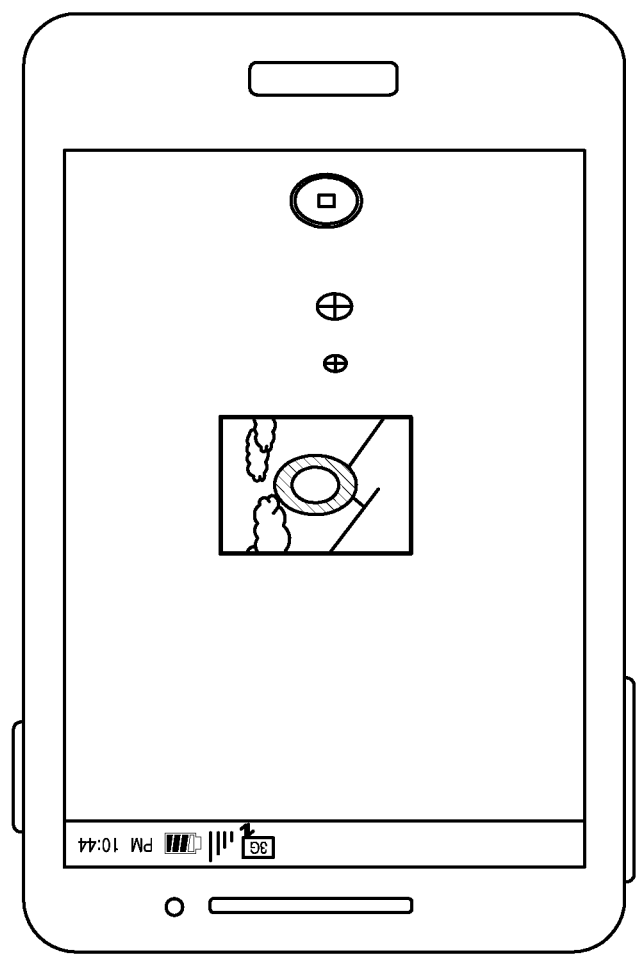
Figure 9A:
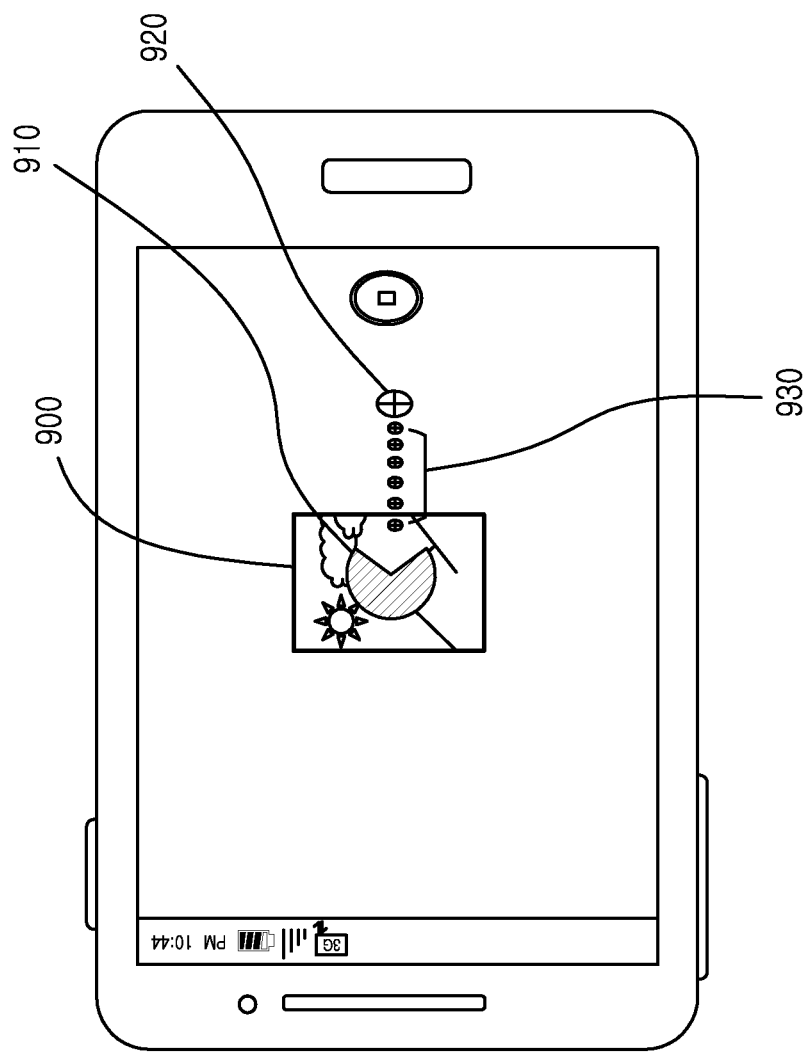
FIGS. 9A, 9B, and 9C are diagrams illustrating a configuration of a screen for displaying guide information for image capture in an electronic device according to a sixth embodiment of the present disclosure.
Figure 9B:
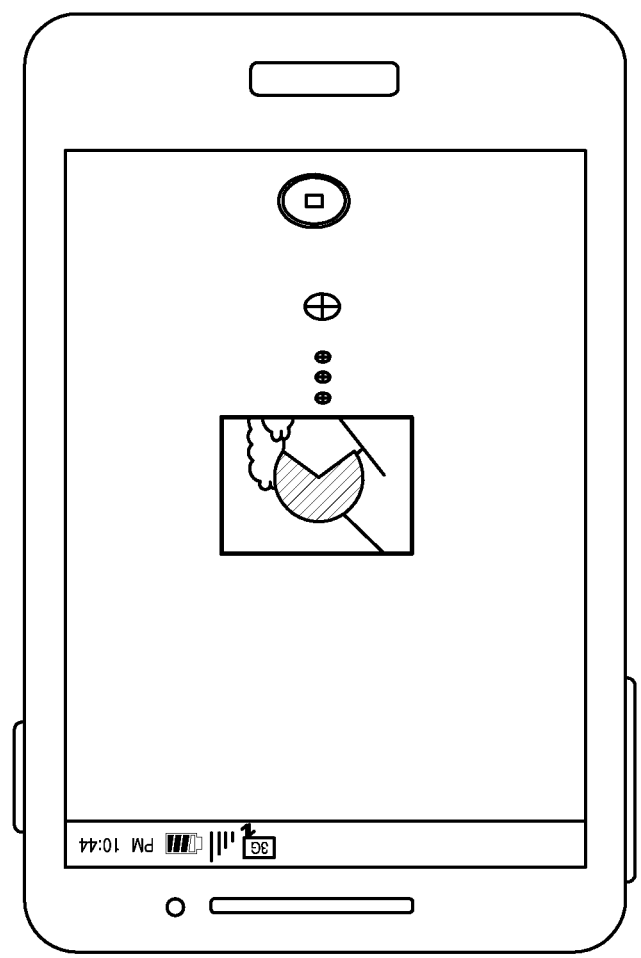
Figure 9C:
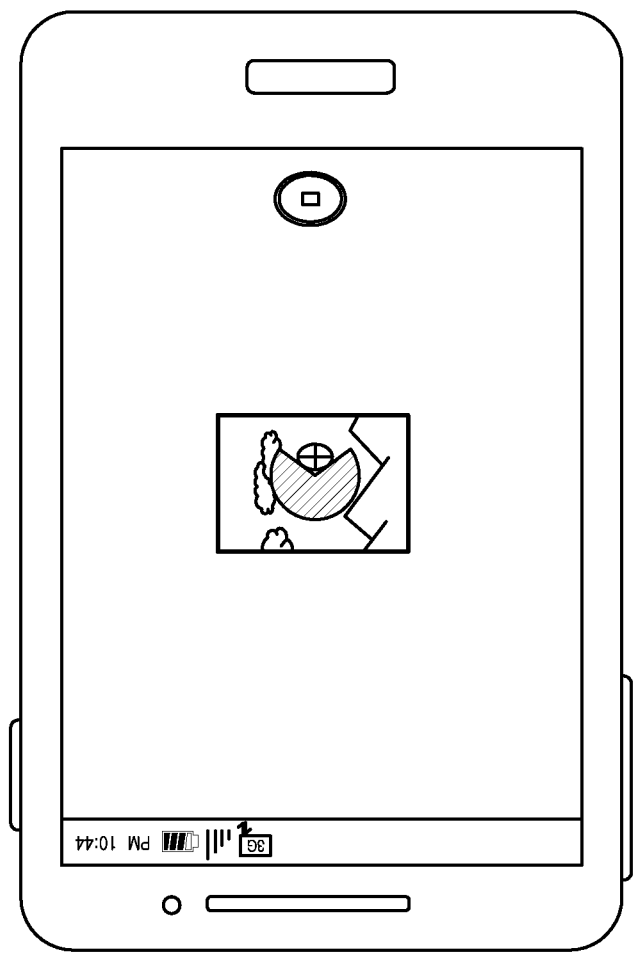
Figure 10A:
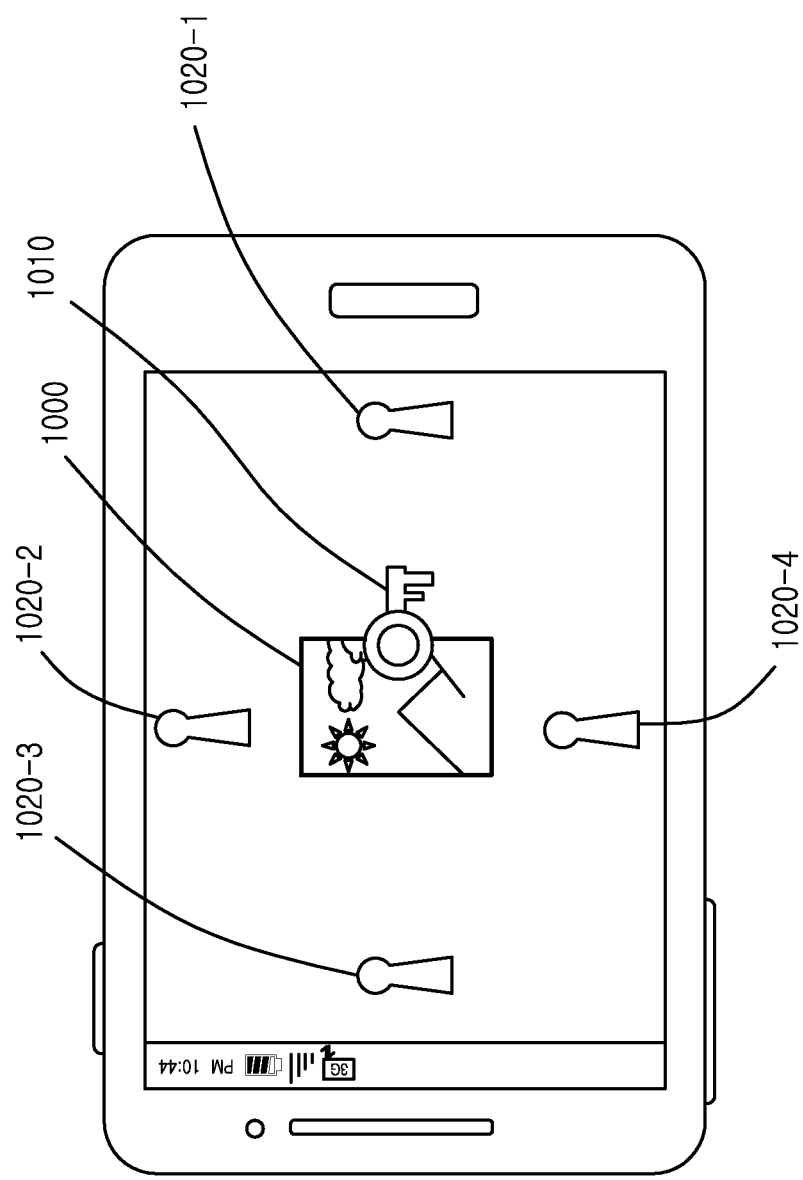
FIGS. 10A and 10B are diagrams illustrating a configuration of a screen for displaying guide information for image capture in an electronic device according to a seventh embodiment of the present disclosure.
Figure 10B:
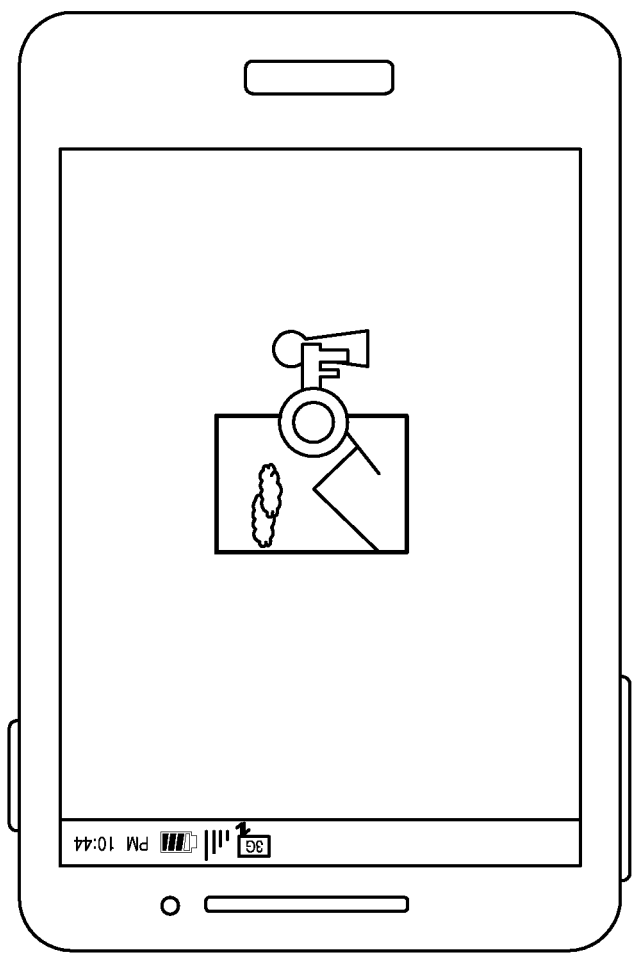
Figure 11A:
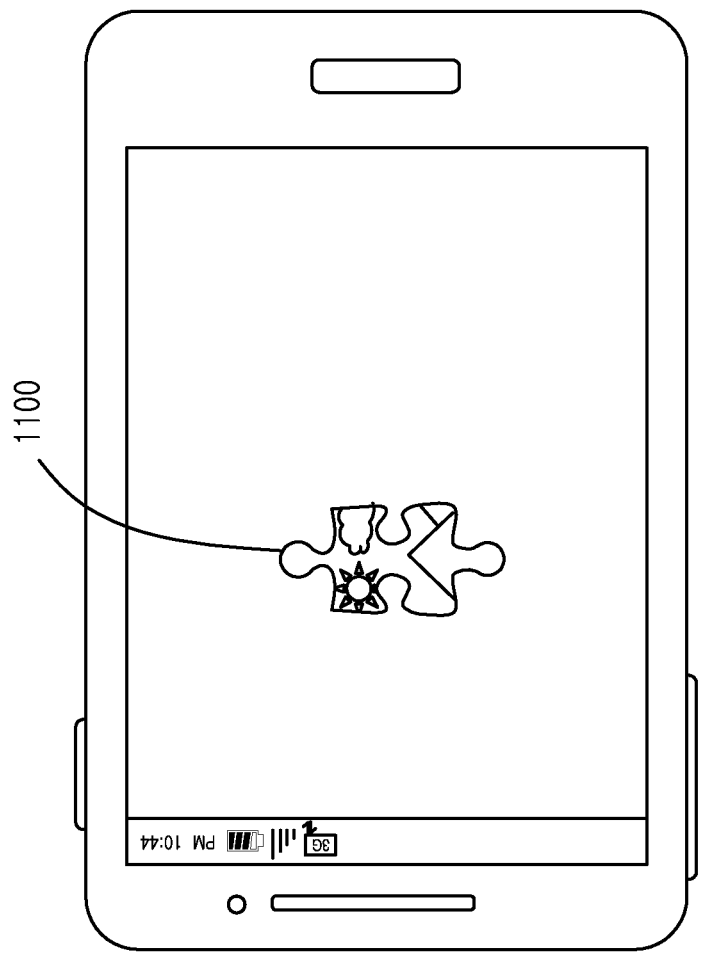
FIGS. 11A, 11B, and 11C are diagrams illustrating a configuration of a screen for displaying guide information for image capture in an electronic device according to an eighth embodiment of the present disclosure.
Figure 11B:
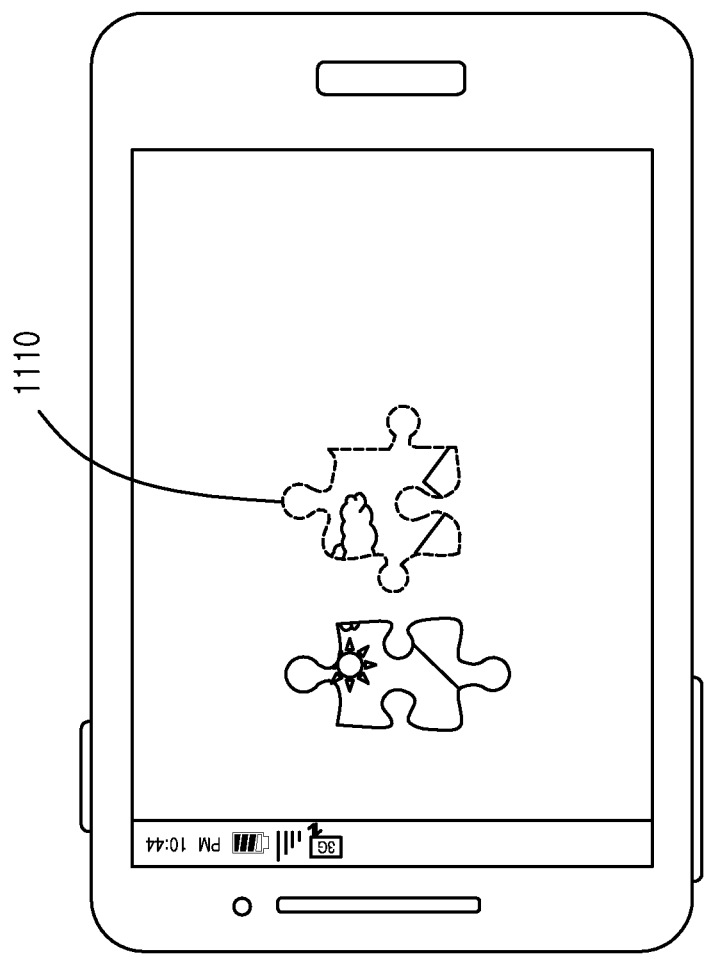
Figure 11C:
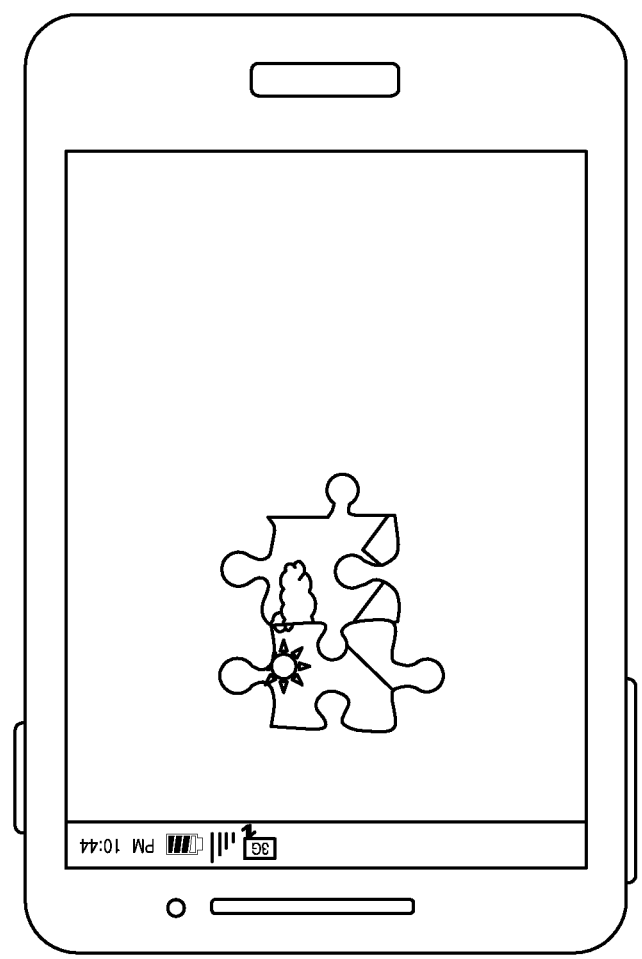
Figure 12B:
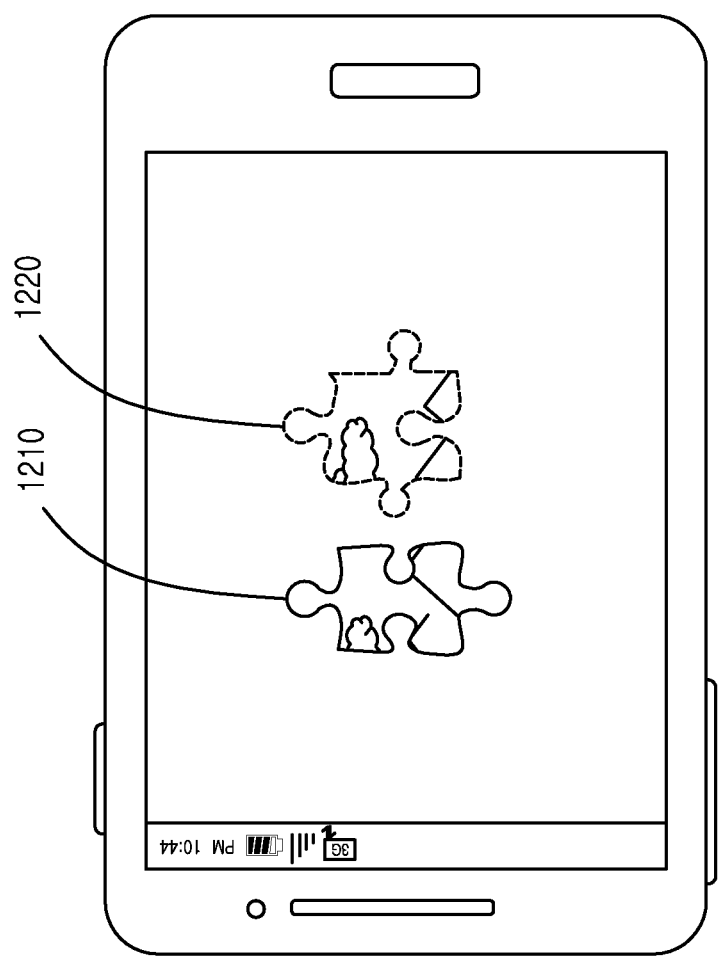
Figure 12C:
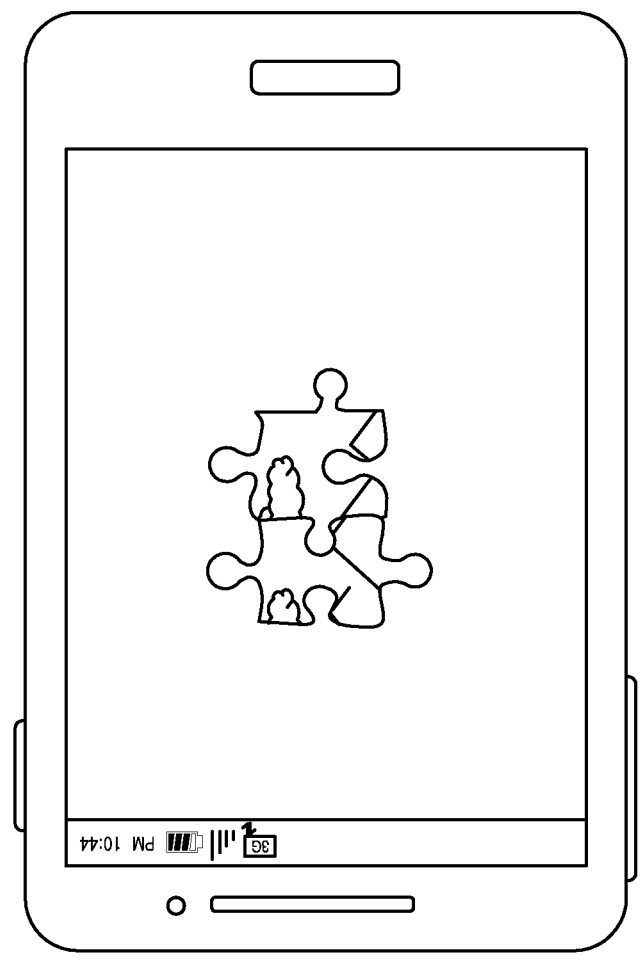

FIG. 1 illustrates a block configuration of an electronic device according to an embodiment of the present disclosure; FIGS. 4A and 4B are diagrams illustrating a configuration of a screen for displaying guide information for image capture in an electronic device according to a first embodiment of the present disclosure; FIGS. 5A and 5B are diagrams illustrating a configuration of a screen for displaying guide information for image capture in an electronic device according to a second embodiment of the present disclosure; FIGS. 6A and 6B are diagrams illustrating a configuration of a screen for displaying guide information for image capture in an electronic device according to a third embodiment of the present disclosure; FIGS. 7A and 7B are diagrams illustrating a configuration of a screen for displaying guide information for image capture in an electronic device according to a fourth embodiment of the present disclosure; FIGS. 8A and 8B are diagrams illustrating a configuration of a screen for displaying guide information for image capture in an electronic device according to a fifth embodiment of the present disclosure; FIGS. 9A, 9B, and 9C are diagrams illustrating a configuration of a screen for displaying guide information for image capture in an electronic device according to a sixth embodiment of the present disclosure; FIGS. 10A and 10B are diagrams illustrating a configuration of a screen for displaying guide information for image capture in an electronic device according to a seventh embodiment of the present disclosure; FIGS. 11A, 11B, and 11C are diagrams illustrating a configuration of a screen for displaying guide information for image capture in an electronic device according to an eighth embodiment of the present disclosure; FIGS. 12A, 12B, and 12C are diagrams illustrating a configuration of a screen for displaying guide information for image capture in an electronic device according to a ninth embodiment of the present disclosure; and FIGS. 13A, 13B, 13C, 13D, and 13E are diagrams illustrating a configuration of a screen for displaying guide information for image capture in an electronic device according to a tenth embodiment of the present disclosure.

Referring to FIG. 1, an electronic device 100 includes a memory 110, a processor unit 120, a camera unit 130, a sensing unit 140, an input/output control unit 150, a display unit 160, and an input device 170. In this case, the memory 110 may be provided in plurality.

The memory 110 may include a program storage unit 111 for storing a program for controlling operation of the electronic device 100, and a data storage unit 112 for storing data generated during operation of the electronic device 100. In this case, the memory 110 may include a volatile memory, for example, a Random Access Memory (RAM), a non-volatile memory, for example, a flash memory, and a combination of a volatile memory and a non-volatile memory.

The data storage unit 112 stores panoramic image information and capture position setting information. For example, when the panoramic image information is stored, the data storage unit 112 may store at least one of an image captured by a capture control program 114 and capture information associated with the image. The capture information associated with the image may include an image capture direction and a direction of the camera unit 130 at a time of storing the image. The capture position setting information may include information for setting capture positions for images used to generate a panoramic image by a panoramic image generation program 115.

The program storage unit 111 includes a Graphic User Interface (GUI) program 113, the capture control program 114, the panoramic image generation program 115, and at least one application program 116. Herein, each program stored in the program storage unit 111 may be expressed as an instruction set that is a collection of instructions.

The GUI program 113 includes at least one software component for providing a GUI on the display unit 160. The GUI program 113 may perform control to display information about application programs executed by the processor unit 120 (ex. processor 122) on the display unit 160. The GUI program 113 may perform control to display guide information used to generate the panoramic image on the display unit 160. The guide information may include capture position information about capture positions for at least one image used to generate a panoramic image and guide object information about a guide object indicating a capture direction of the camera unit 130. The capture position information may indicate relative positions of at least one image used to generate a panoramic image with respect to an image which is initially acquired by the camera unit 130 in order to generate a panoramic image, and the position information of the electronic device 100 at a time at which a panoramic image service is started.

For example, referring to FIGS. 1, 4A, and 8A, the GUI program 113 may enable the display unit 160 to display a guide object 410, having a shape of a hollow circle, in a predetermined portion of a central area of a preview image 400, and may display at least one of capture-position icons 420-1 and 420-2, indicating central coordinates of capture areas, for images used to generate a panoramic image, as illustrated in FIG. 4A. In this case, the GUI program 113 may perform control to display the capture-position icons 420-1 and 420-2, having a shape of a circle, which may be included within a cavity region of the hollow circle displayed as the guide object 410. In addition, the GUI program 113 may perform control to display a point 412 indicating a capture position in the body of the hollow circle. Alternatively, the GUI program 113 may perform control to display at least one sub-capture-position icon 830 between a guide object 810, shown in a preview image 800, and a capture-position icon 820, as illustrated in FIG. 8A.

In another example, referring to FIGS. 1 and 5A, the GUI program 113 may enable the display unit 160 to display a guide object 510, having a shape protruding in multiple directions, in a predetermined portion of a central area of a preview image 500, and may display at least one of capture-position icon 520-1 and 520-2, indicating central coordinates of capture areas, for images used to generate a panoramic image, as illustrated in FIG. 5A. In this case, the GUI program 113 may perform control to display the capture-position icons 520-1 and 520-2, having a shape of a circle, which may include the shape protruding in multiple directions displayed as the guide object 510. The GUI program 113 may perform control to display an adjacent capture position by controlling a shade and/or a color of a protruding portion 512.

In still another example, referring to FIGS. 1 and 6A, the GUI program 113 may enable the display unit 160 to display a guide object 610, having a shape of a hollow cylinder, such as a golf hole, in a predetermined portion of the central area of a preview image 600, and may display at least one of capture-position icons 620, indicating the central coordinates of capture areas, for images used to generate a panoramic image, as illustrated in FIG. 6A. In this case, the GUI program 113 may perform control to display the capture-position icon 620 having a shape of a circle, which may be included within the cavity region of the hollow cylinder displayed as the guide object 610.

In still another example, referring to FIGS. 1 and 7A, the GUI program 113 may enable the display unit 160 to display a guide object 710 having a spiral shape, such as a golf hole, in a predetermined portion of a central area of a preview image 700, and may display at least one capture-position icon 720, indicating central coordinates of capture areas for images used to generate a panoramic image, as illustrated in FIG. 7A. In this case, the GUI program 113 may perform control to display the capture-position icon 720 in such a way that the capture-position icon 720 is sucked down into the spiral displayed as the guide object 710.

In still another example, referring to FIGS. 1 and 9A, the GUI program 113 may enable the display unit 160 to display a guide object 910 having a shape of a Pac-Man, in a predetermined portion of the central area of a preview image 900, and may display at least one capture-position icon 920, indicating central coordinates of capture areas for images used to generate a panoramic image, as illustrated in FIG. 9A. In this case, the GUI program 113 may perform control to display at least one sub-capture-position icon 930 between the guide object 910 and the capture-position icon 920.

In still another example, referring to FIGS. 1 and 10A, the GUI program 113 may enable the display unit 160 to display a guide object 1010, having a shape of a key, in an edge of a preview image 1000, and may display at least one of capture-position icons 1020-1, 1020-2, 1020-3, and 1020-4, in edges of a capture area for an image used to generate a panoramic image, as illustrated in FIG. 10A. In this case, the GUI program 113 may perform control to display the capture-position icons 1020-1 and 1020-4, having the shape of a keyhole, into which the key displayed as the guide object 1010 may be inserted.

In still another example, referring to FIGS. 1, 11A, and 11B, the GUI program 113 may enable the display unit 160 to display a preview image area in a first shape of a puzzle piece 1100, as illustrated in FIG. 11A, and may display a capture area for an image used to generate a panoramic image in a second shape of a puzzle piece 1110, corresponding to the first shape of the puzzle piece, as illustrated in FIG. 11B.

In still another example, referring to FIGS. 1, 12A, and 12B, the GUI program 113 may enable the display unit 160 to display a preview image area in a first shape of a puzzle piece 1200, as illustrated in FIG. 12A. When the capture control program 114 captures the image area displayed in the first shape of the puzzle piece 1200, the GUI program 113 may enable the display unit 160 to display the captured image in a second shape of a puzzle piece 1210, as illustrated in FIG. 12B, and may display a capture area for an image used to generate a panoramic image in a first shape of a puzzle piece 1220.

Figure 13A:
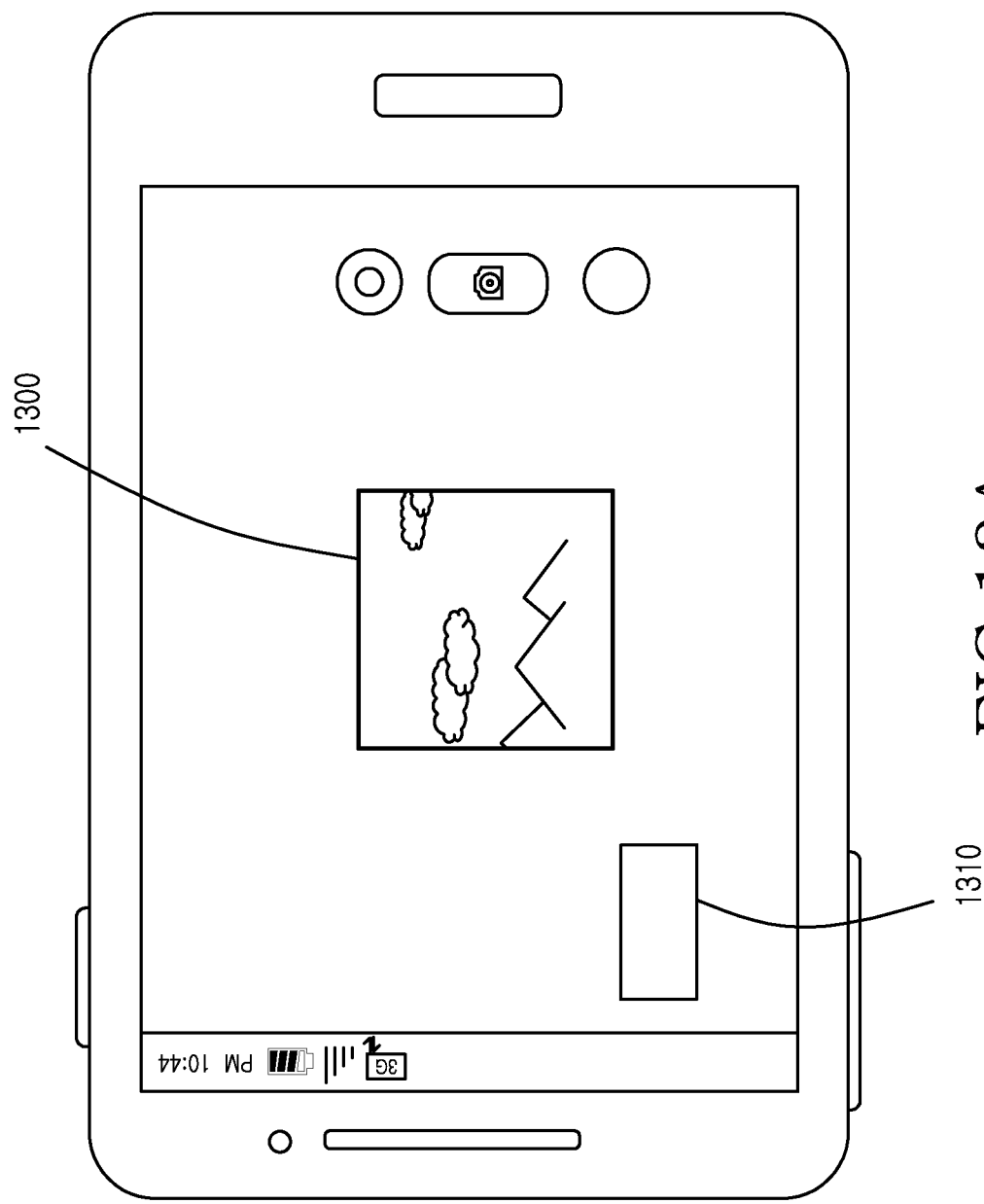
Figure 13C:
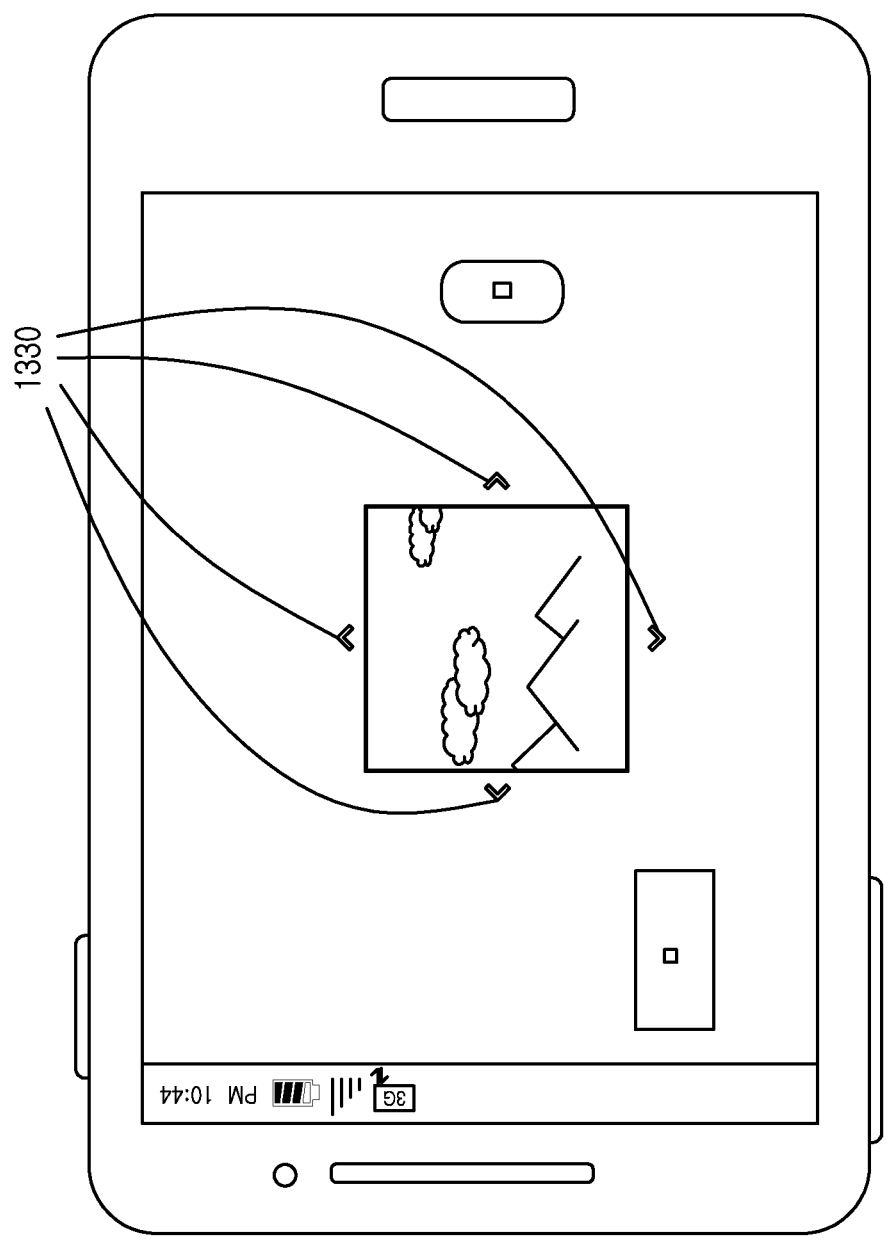
Figure 13D:
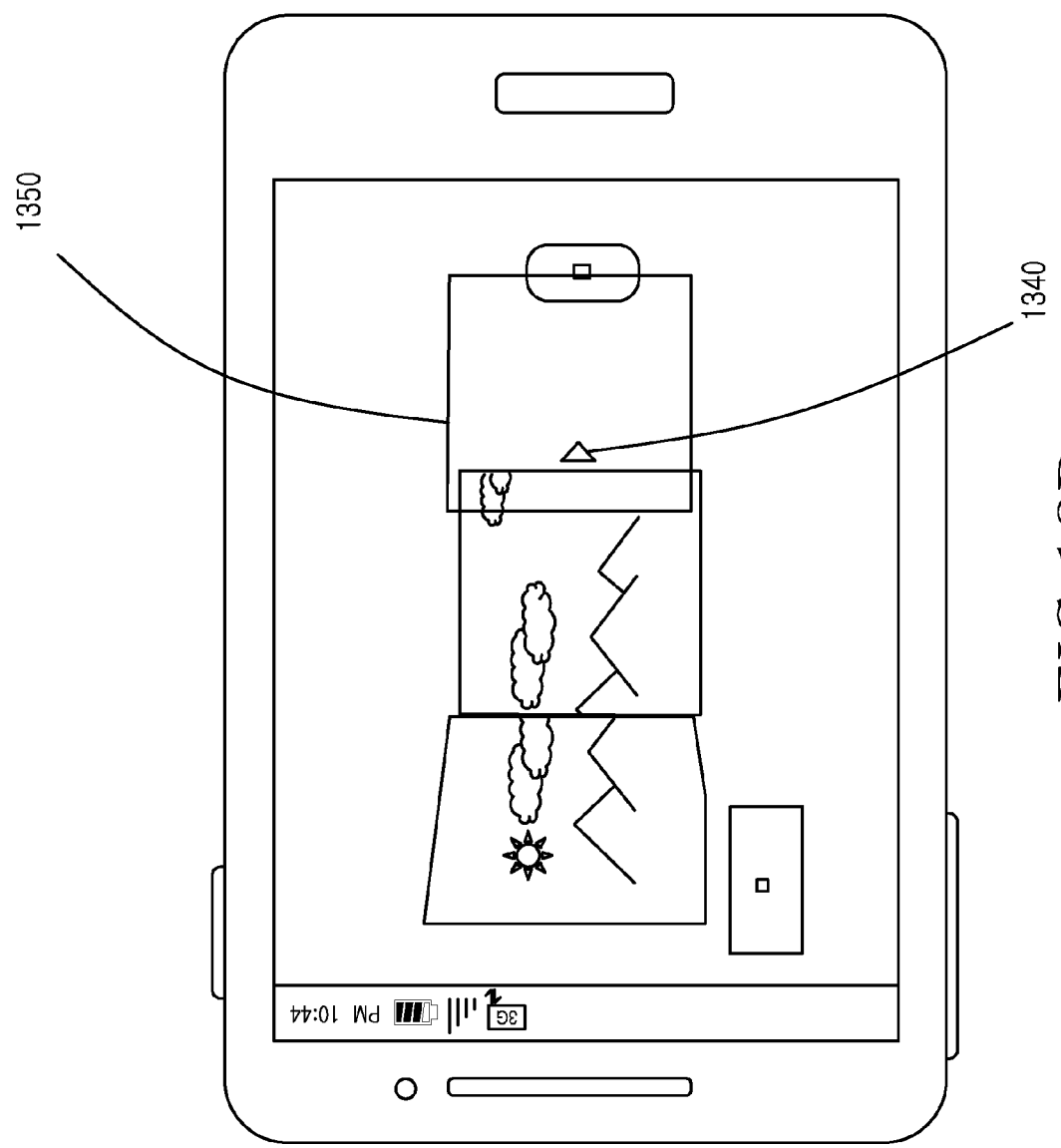

In another example, referring to FIGS. 1 and 13D, the GUI program 113 may enable the display unit 160 to display a contour 1350 of a capture area for an image used to generate a panoramic image, as illustrated in FIG. 13D.

The capture control program 114 includes at least one software component for acquiring an image used to generate a panoramic image. For example, the capture control program 114 may perform control to acquire images used to generate a panoramic image in consideration of the movement information of the electronic device 100, which is provided from the sensing unit 140. That is, the capture control program 114 may acquire images through the camera unit 130 based on the movement information of the electronic device 100 provided from the sensing unit 140 and based on position information about respective capture positions.

For example, when at least one of the capture-position icons 420-1, 420-2, 520-1, 520-2, 620, 720, 820 and 920 of an image capture area is displayed as a capture position on the display unit 160, as illustrated in FIG. 4A, 5A, 6A, 7A, 8A, or 9A, the capture control program 114 may acquire an image including the capture position through the camera unit 130 at a time when at least one of the capture position icons 420-1, 420-2, 520-1, 520-2, 620, 720, 820, and 920 and the guide objects 410, 510, 610, 710, 810, or 910 overlap each other.

In another example, when the capture-position icons 1020-1, 1020-2, 1020-3, and 1020-4, of the image capture area are displayed as capture positions on the display unit 160, as illustrated in FIG. 10A, the capture control program 114 may acquire, through the camera unit 130, an image included in a predetermined range, and/or distance, around the capture position at a time when at least one of the capture position icons 1020-1, 1020-2, 1020-3, and 1020-4, and the guide object 1010 overlap each other.

In still another example, when an image capture area is displayed in the shape of the puzzle piece on the display unit 160, as illustrated in FIGS. 11A and 12A, the capture control program 114 may acquire, through the camera unit 130, an image included in a puzzle piece located at a capture position at a time when the puzzle piece located at the capture position is matched with a puzzle piece for a guide object.

In still another example, when a contour of an image capture area is displayed on the display unit 160, as illustrated in FIG. 13A, the capture control program 114 may acquire, through the camera unit 130, a preview image at a time when the preview image is included within the contour of the capture area.

The panoramic image generation program 115 includes at least one software component for generating a panoramic image using images acquired through the camera unit 130 under the control of the capture control program 113. For example, the panoramic image generation program 115 maps images at position information, such as the direction of a camera, corresponding to the coordinate values of a two-dimensional projection model, from among the images acquired according to the control of the capture control program 113, onto the two-dimensional projection model to generate a two-dimensional panoramic image. In this case, the two-dimensional projection model may be represented in a transparent plane, such as a circle, an oval, and a polygon. For example, the panoramic image generation program 115 maps images at position information corresponding to the coordinate values of a three-dimensional projection model, from among the images acquired according to the control of the capture control program 113, onto the three-dimensional projection model to generate a three-dimensional panoramic image. In this case, the panoramic image generation program 115 converts coordinate values of the two-dimensional image into three-dimensional coordinate values by using a virtual focus distance. Thereafter, the panoramic image generation program 115 may generate a three-dimensional image by converting the three-dimensional coordinate values for images into the coordinate values of the three-dimensional projection model. The three-dimensional projection model may be represented in a spherical and/or a hemispherical stereoscopic shape.

The application program 116 includes a software component for at least one application program installed in the electronic device 100.

The processor unit 120 includes a memory interface 121, at least one processor 122, and a peripheral interface 123. In this case, the memory interface 121, the at least one processor 122, and the peripheral interface 123, which are included in the processor unit 120, may be integrated into at least one integrated circuit or may be implemented as separate components.

The memory interface 121 controls access to the memory 100 of components, such as the processor 122 and/or the peripheral interface 123.

The peripheral interface 123 controls connections of the input/output peripherals of the electronic device 100 to the processor 122 and the memory interface 121.

The processor 122 enables the electronic device 100 to provide various multimedia services using at least one software program. In this case, the processor 122 executes at least one program stored in the memory 110 and provides a service corresponding to the program.

The camera unit 130 provides collected images, which are acquired through capture of a subject, to the processor unit 120. Specifically, the camera unit 130 may include a camera sensor for converting an optical signal into an electrical signal, an image processing device for converting an analog image signal into a digital image signal, and a signal processing device for performing image processing to display an image signal output from the image processing device on the display unit 170. In this case, the camera unit 130 may include at least one camera unit included in the electronic device 100.

The sensing unit 140 detects movement of the electronic device 100. For example, the sensing unit 140 detects movement of the electronic device 100 using at least one of an acceleration sensor, a gravity sensor, a gyroscope, a gyrocompass, a digital compass, a tilt sensor, and a geomagnetic sensor. The movement of the electronic device 100 may include a direction, a movement angle, or the like, of the electronic device 100.

The input/output control unit 150 provides an interface between an input/output device, such as the display unit 160 and the input device 170, and the peripheral interface 123.

The display unit 160 displays state information of the electronic device 100, characters input by the user, moving pictures, still pictures, or the like. For example, the display unit 170 displays information about application programs executed by the processor 122. In addition, the display unit 160 may display guide information used to generate a panoramic image. The guide information may capture position information about capture positions for at least one of images used to generate a panoramic image and guide object information about a guide object indicating a capture direction of the camera unit 130. The capture position information may indicate relative positions of at least one of images used to generate a panoramic image with respect to an image, which is initially acquired by the camera unit 130, in order to generate a panoramic image and/or the position information of the electronic device 100 at a time at which a panoramic image service is started.

For example, the display unit 160 may display the guide object 410 having the shape of the hollow circle, in the predetermined portion of the central area of the preview image 400, and may display the at least one of the capture-position icons 420-1 and 420-2 indicating the central coordinates of capture areas for images used to generate a panoramic image, as illustrated in FIG. 4A. In this case, the display unit 160 may display the capture-position icons 420-1 and 420-2 having the shape of a circle, which may be included within the cavity region of the hollow circle displayed as the guide object 410. In addition, the display unit 160 may display the point 412 indicating a capture position in the body of the hollow circle. Alternatively, the display unit 160 may display the at least one sub-capture-position icon 830 between the guide object 810 and the capture-position icon 820, as illustrated in FIG. 8A.

For example, the display unit 160 may display the guide object 510, having the shape protruding in multiple directions in the predetermined portion of the central area of the preview image 500, and may display the at least one of the capture-position icons 520-1 and 520-2, indicating the central coordinates of the capture areas for images used to generate a panoramic image, as illustrated in FIG. 5A. In this case, the display unit 160 may display the capture-position icons 520-1 and 520-2, having the shape of a circle which may include the shape protruding in multiple directions displayed as the guide object 510. The display unit 160 may display the adjacent capture position by controlling the shade and/or the color of the protruding portion 512.

In still another example, the display unit 160 may display the guide object 610, having the shape of the hollow cylinder, such as a golf hole, in a predetermined portion of the central area of the preview image 600, and may display at least one of the capture-position icon 620, indicating the central coordinates of the capture areas for images used to generate a panoramic image, as illustrated in FIG. 6A. In this case, the display unit 160 may display the capture-position icon 620 having the shape of the circle, which may be included within the cavity region of the hollow cylinder displayed as the guide object 610.

In still another example, the display unit 160 may display the guide object 710, having a spiral shape, such as a golf hole, in the predetermined portion of the central area of the preview image 700, and may display at least one of the capture-position icon 720, indicating the central coordinates of the capture areas for images used to generate a panoramic image, as illustrated in FIG. 7A. In this case, the display unit 160 may display the capture-position icon 720 in such a way that the capture-position icon 720 is sucked down into the spiral displayed as the guide object 710.

In still another example, the display unit 160 may display the guide object 910, having the shape of the Pac-Man, in a predetermined portion of the central area of the preview image 900, and may display at least one of the capture-position icon 920, indicating the central coordinates of the capture areas for images used to generate a panoramic image, as illustrated in FIG. 9A In this case, the display unit 160 may display at least one of the sub-capture-position icon 930 between the guide object 910 and the capture-position icon 920.

In still another example, the display unit 160 may display the guide object 1010, having the shape of a key in an edge of a preview image 1000, and may display at least one of the capture-position icons 1020-1 to 1020-4, in edges of the capture area for images used to generate a panoramic image, as illustrated in FIG. 10A. In this case, the display unit 160 may display the capture-position icons 1020-1 and 1020-4, having the shape of a keyhole into which the key displayed as the guide object 1010 may be inserted.

In still another example, the display unit 160 may display a preview image area in the first shape of puzzle piece 1100 and may display a capture area for an image used to generate a panoramic image in a second shape of the puzzle piece 1110 corresponding to the first shape of the puzzle piece 1100, as illustrated in FIG. 11A.

In still another example, the display unit 160 may display a preview image area in the first shape of the puzzle piece 1200, as illustrated in FIG. 12A. When the capture control program 114 captures the image area displayed in the first shape of the puzzle piece 1200, the display unit 160 may display the captured image in the second shape of the puzzle piece 1210, and may display a capture area for an image used to generate a panoramic image in the first shape of the puzzle piece 1220, as illustrated in FIG. 12B.

In another example, the display unit 160 may display the contour 1350 of the capture area for an image used to generate a panoramic image, as illustrated in FIG. 13D.

The input device 170 provides input data, generated by a user's selection, to the processor unit 120 through the input/output control unit 150. In this case, the input device 180 includes a keypad, including at least one hardware button, a touch pad for detecting touch information, and the like. For example, the input device 170 provides touch information, detected through the touch pad, to the processor 122 through the input/output control unit 150.

In addition, the electronic device 100 may include a communication system (not shown) for performing communication functions for voice communication and data communication. In this case, the communication system may be classified into a plurality of communication sub-modules which support different communication networks. For example, the communication networks may include, but are not limited to, a Global System for Mobile communication (GSM) network, an Enhanced Data GSM Environment (EDGE) network, a Code Division Multiple Access (CDMA) network, a Wideband-CDMA (W-CDMA) network, a Long Term Evolution (LTE) network, an Orthogonal Frequency Division Multiple Access (OFDMA) network, a wireless LAN, a Bluetooth network, a Near Field Communication (NFC) network, and the like.

Figure 2:
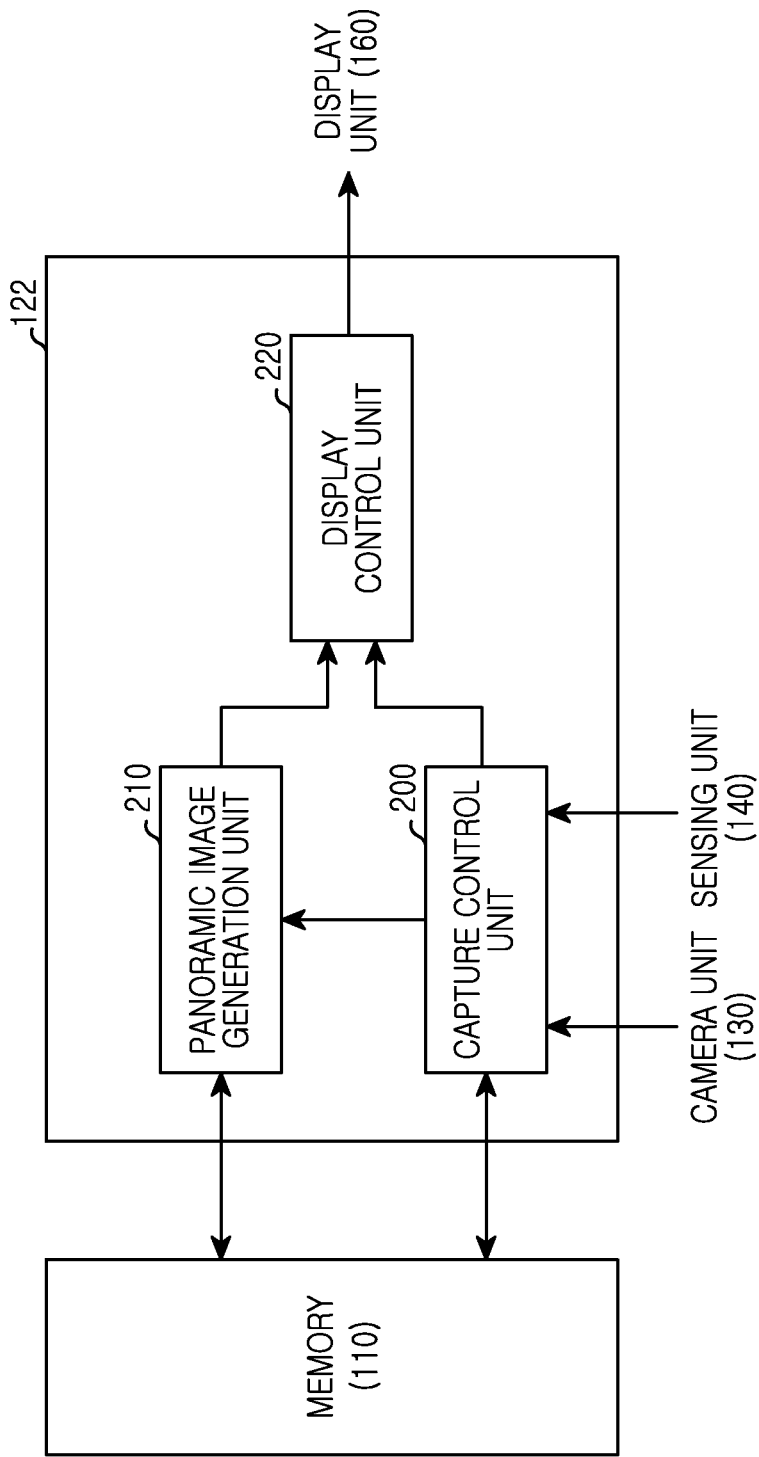
FIG. 2 is a diagram illustrating a detailed block configuration of a processor according to an embodiment of the present disclosure.

FIG. 2 illustrates a block configuration of a processor according to an embodiment of the present disclosure.

Referring to FIG. 2, the processor 122 includes a capture control unit 200, a panoramic image generation unit 210, and a display control unit 220.

The capture control unit 200 may execute the capture control program 114, stored in the program storage unit 111, to acquire images used to generate a panoramic image. For example, the capture control unit 200 may perform control to acquire images used to generate a panoramic image in consideration of the movement information of the electronic device 100, which is provided from the sensing unit 140. That is, the capture control unit 200 may acquire images through the camera unit 130, based on the movement information of the electronic device 100 provided from the sensing unit 140 and position information about respective capture positions.

For example, when the at least one of the capture-position icons 420-1, 420-2, 520-1, 520-2, 620, 720, 820 and 920 of an image capture area is displayed as a capture position on the display unit 160, as illustrated in FIG. 4A, 5A, 6A, 7A, 8A, or 9A, the capture control unit 200 may acquire an image including the capture position through the camera unit 130 at a time when the capture-position icons 420-1, 420-2, 520-1, 520-2, 620, 720, 820, and 920 and the guide object 410, 510, 610, 710, 810, and 910 overlap each other.

In another example, when the edges 1020 of the image capture area are displayed as capture positions on the display unit 160, as illustrated in FIG. 10A, the capture control unit 200 may acquire, through the camera unit 130, an image included in a predetermined range, which may be a distance, around the capture position at a time when the capture position 1020 and the guide object 1010 overlap each other.

In still another example, when an image capture area is displayed in a puzzle piece on the display unit 160, as illustrated in FIGS. 11A and 12A, the capture control unit 200 may acquire, through the camera unit 130, an image included in a puzzle piece located at a capture position at a time when the puzzle piece located at the capture position is matched with a puzzle piece for a guide object.

In still another example, when a contour of an image capture area is displayed on the display unit 160, as illustrated in FIG. 13A, the capture control unit 200 may acquire, through the camera unit 130, a preview image at a time when the preview image is included within the contour of the capture area.

The panoramic image generation unit 210 may generate a panoramic image by executing the panoramic image generation program 115, stored in the program storage unit 111. For example, the panoramic image generation unit 210 maps images at position information corresponding to the coordinate values of a two-dimensional projection model, from among the images acquired according to the control of the capture control program 113, onto the two-dimensional projection model to generate a two-dimensional panoramic image. In this case, the two-dimensional projection model may be represented in a transparent plane, such as a circle, an oval, and a polygon. For example, the panoramic image generation unit 210 maps images at position information corresponding to the coordinate values of a three-dimensional projection model, from among the images acquired according to the control of the capture control program 113, onto the three-dimensional projection model to generate a three-dimensional panoramic image. In this case, the panoramic image generation unit 210 converts the coordinate values of the two-dimensional image into three-dimensional coordinate values by using a virtual focus distance. Thereafter, the panoramic image generation unit 210 may generate a three-dimensional image by converting the three-dimensional coordinate values for images into the coordinate values of the three-dimensional projection model. The three-dimensional projection model may be represented in a spherical and/or hemispherical stereoscopic shape.

The display control unit 220 may execute a GUI program 113, stored in the program storage unit 111, to provide a graphic user interface on the display unit 160. The display control unit 220 may perform control to display information, about application programs executed by the processor 122, on the display unit 160. The display control unit 220 may perform control to display guide information, used to generate the panoramic image, on the display unit 160. The guide information may include capture position information associated with at least one image used to generate the panoramic image and guide object information indicating the capture direction of the camera unit 130. The capture position information may indicate relative positions of at least one image used to generate a panoramic image, with respect to an image which is initially acquired by the camera unit 130, in order to generate a panoramic image, and/or the position information of the electronic device 100 at a time at which a panoramic image service is started.

For example, the display control unit 220 may enable the display unit to display the guide object 410, having the shape of the hollow circle in the predetermined portion of the central area of the preview image 400, and may display at least one of the capture-position icons 420-1 and 420-2, indicating the central coordinates of the capture areas for images used to generate a panoramic image, as illustrated in FIG. 4A. In this case, the display control unit 220 may perform control to display the capture-position icons 420-1 and 420-2, having the shape of the hollow circle, which may be included within the cavity region of the hollow circle displayed as the guide object 410. In addition, the display control unit 220 may perform control to display the point 412, indicating the capture position in the body of the hollow circle. Alternatively, the display control unit 220 may perform control to display at least one of the sub-capture-position icon 830 between the guide object 810 and the capture-position icon 820, as illustrated in FIG. 8A.

In another example, the display control unit 220 may enable the display unit 160 to display the guide object 510, having the shape protruding in multiple directions in the predetermined portion of the central area of the preview image 500, and may display at least one of the capture-position icons 520-1 and 520-2, indicating the central coordinates of the capture areas for images used to generate a panoramic image, as illustrated in FIG. 5A. In this case, the display control unit 220 may perform control to display the capture-position icons 520-1 and 520-2, having the shape of a circle, which may include the shape protruding in multiple directions displayed as the guide object 510. The display control unit 220 may perform control to display an adjacent capture position by controlling the shade and/or the color of the protruding portion 512.

In still another example, the display control unit 220 may enable the display unit 160 to display the guide object 610, having the shape of the hollow cylinder, such as a golf hole, in a predetermined portion of the central area of the preview image 600, and may display at least one of the capture-position icon 620, indicating the central coordinates of the capture areas for images used to generate a panoramic image, as illustrated in FIG. 6A. In this case, the display control unit 220 may perform control to display the capture-position icon 620, having the shape of a circle, which may be included within the cavity region of the hollow cylinder displayed as the guide object 610.

In still another example, the display control unit 220 may enable the display unit 160 to display the guide object 710, having the spiral shape, such as a golf hole, in a predetermined portion of the central area of the preview image 700, and may display at least one of the circular capture-position icon 720, indicating the central coordinates of capture areas for images used to generate a panoramic image, as illustrated in FIG. 7A. In this case, the display control unit 220 may perform control to display the capture-position icon 720 in such a way that the capture-position icon 720 is sucked down into the spiral displayed as the guide object 710.

In still another example, the display control unit 220 may enable the display unit 160 to display the guide object 910, having the shape of a Pac-Man, in a predetermined portion of the central area of the preview image 900, and may display at least one of the capture-position icon 920, indicating the central coordinates of the capture areas for images used to generate a panoramic image, as illustrated in FIG. 9A. In this case, the display control unit 220 may perform control to display at least one of the sub-capture-position icon 930 between the guide object 910 and the capture-position icon 920.

In still another example, the display control unit 220 may enable the display unit 160 to display the guide object 1010, having the shape of a key, in an edge of the preview image 1000, and may display at least one of the capture-position icons 1020-1 to 1020-4 in edges of a capture area for an image used to generate a panoramic image, as illustrated in FIG. 10A. In this case, the display control unit 220 may perform control to display the capture-position icons 1020-1 and 1020-4, having the shape of a keyhole, into which the key displayed as the guide object 1010 may be inserted.

In still another example, the display control unit 220 may enable the display unit 160 to display a preview image area in the first shape of the puzzle piece 1100 and may display a capture area for an image used to generate a panoramic image in the second shape of the puzzle piece 1110, corresponding to the first shape of the puzzle piece 1100, as illustrated in FIG. 11A.

In still another example, the display control unit 220 enables the display unit 160 to display a preview image area in the first shape of the puzzle piece 1200, as illustrated in FIG. 12A. When the capture control unit 200 captures the image area displayed in the first shape of the puzzle piece 1200, the display control unit 220 may enable the display unit 160 to display the captured image in the second shape of the puzzle piece 1210 and may display a capture area for an image used to generate a panoramic image in the first shape of the puzzle piece 1220, as illustrated in FIG. 12B.

In another example, the display control unit 220 may enable the display unit 160 to display the contour 1350 of the capture area for an image used to generate a panoramic image as illustrated in FIG. 13D.

Figure 3:
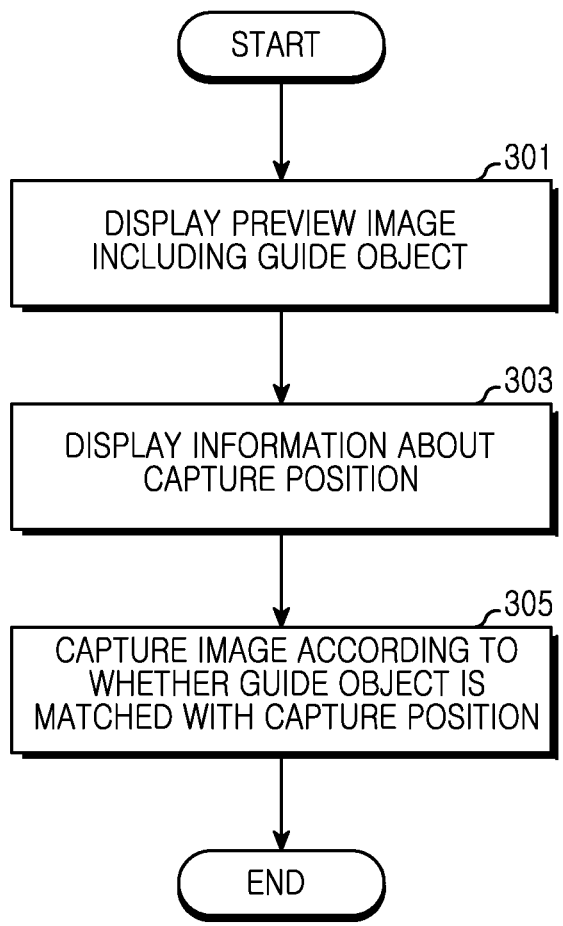
FIG. 3 is a diagram illustrating a process for capturing an image in an electronic device according to a first embodiment of the present disclosure.

FIG. 3 illustrates a process for capturing an image in an electronic device according to a first embodiment of the present disclosure.

Referring to FIG. 3, in operation 301, an electronic device may display a first image, which may also be referred to as a preview image, including at least one guide object, on the display unit 160. For example, the electronic device may display the first image including the guide object on a portion of the display unit 160. In this case, the electronic device may determine the display color and brightness of the guide object in consideration of the color and brightness of an area of the first image on which the guide object is displayed. The first image may include a preview image acquired through the camera unit 130 and/or an image captured by the capture control unit 200.

In operation 303, the electronic device may display information about at least one capture position for at least one image used to generate a panoramic image on the display unit 160. In this case, the electronic device may display the information about the at least one capture position in a square and/or a honeycomb shape on the display unit 160. In addition, the electronic device may stereoscopically display the capture positions in a virtual sphere.

After displaying the at least one guide object and the capture position information about the at least one capture position, the electronic device may capture an image at the capture position when the guide object is matched with the capture position information, or in other words, the electronic device may capture the image according to whether the at least one guide object is matched with the at least one capture position in operation 305.

For example, the electronic device may display the guide object and the capture position information on the display unit 150 as illustrated in FIGS. 4A to 12C.

As illustrated in FIG. 4A, the electronic device may display the guide object 410, having the shape of the hollow circle, in a predetermined portion of the central area of the preview image 400 on the display unit 160, and may display at least one of the capture-position icons 420-1 and 420-2 having the shape of a circle which may be included within the cavity region of the hollow circle displayed as the guide object 410 on the display unit 160. The capture-position icons 420-1 and 420-2 may represent the central coordinates of capture areas for images used to generate a panoramic image.

In this case, the electronic device may display the direction of the capture-position icon 420-1 adjacent to the guide object 410 on the display unit 160 by using the point 412 located in the body of the hollow circle displayed as the guide object 410.

When the guide object 410 and the capture-position icon 420-1 overlay each other, within a reference range, which may be a reference distance, according to the movement of the electronic device, as illustrated in FIG. 4B, the electronic device may capture an image corresponding to a capture area including the capture-position icon 420-1.

As illustrated in FIG. 5A, the electronic device may display the guide object 510, having the shape protruding in multiple directions, in a predetermined portion of the central area of the preview image 500 on the display unit 160, and may display at least one of the capture-position icons 520-1 and 520-2, having the shape of a circle, which may include the shape protruding in multiple directions, displayed as the guide object 510. The capture-position icons 520-1 and 520-2 may represent the central coordinates of capture areas for images used to generate a panoramic image.

In this case, the electronic device may display the direction of the capture-position icon 520-1, adjacent to the guide object 510, on the display unit 160 by adjusting the shade and the color of the protruding portion 512 displayed as the guide object 510.

When the guide object 510 and the capture-position icon 520-1 overlay each other, within a reference range and/or distance, according to the movement of the electronic device, as illustrated in FIG. 5B, the electronic device may capture an image corresponding to a capture area including the capture-position icon 520-1.

As illustrated in FIG. 6A, the electronic device may display the guide object 610, having the shape of the hollow cylinder, such as a golf hole, in a predetermined portion of the central area of the preview image 600 on the display unit 160, and may display at least one of the capture-position icon 620, having the shape of a circle, which may be included within the cavity region of the hollow cylinder, displayed as the guide object 610 on the display unit 160. The capture-position icon 620 may represent the central coordinates of a capture area for an image used to generate a panoramic image.

When the guide object 610 and the capture-position icon 620 overlay each other, within a reference range and/or distance, according to the movement of the electronic device, as illustrated in FIG. 6B, the electronic device may capture an image corresponding to a capture area including the capture-position icon 620. In this case, the electronic device may capture an image while displaying an animation in which the capture-position icon 620 is inserted into the guide object 610.

As illustrated in FIG. 7A, the electronic device may display the guide object 710, having the spiral shape, such as a golf hole, in a predetermined portion of the central area of the preview image 700 on the display unit 160, and may display the capture-position icon 720 in a such a way that the capture-position icon 720 is sucked down into the spiral displayed as the guide object 710 on the display unit 160. The capture-position icon 720 may represent the central coordinates of a capture area for an image used to generate a panoramic image.

When the guide object 710 and the capture-position icon 720 overlay each other, within a reference range and/or distance, according to the movement of the electronic device, as illustrated in FIG. 7B, the electronic device may capture an image corresponding to a capture area including the capture-position icon 720. In this case, the electronic device may capture an image while displaying an animation in which the capture-position icon 720 is inserted into the guide object 710.

As illustrated in FIG. 8A, the electronic device may display the guide object 810, having the shape of the hollow circle, in a predetermined portion of the central area of the preview image 800 on the display unit 160, and may display at least one of the capture-position icon 820, having the shape of a circle, which may be included within the cavity region of the hollow circle displayed as the guide object 410 on the display unit 160. The capture-position icon 820 may represent the central coordinates of a capture area for an image used to generate a panoramic image.

The electronic device may display at least one of the sub-capture-position icon 830 between the guide object 810 and an adjacent one of the capture-position icon 820. In this case, the electronic device may control how many sub-capture-position icons 830 are displayed depending on the distance between the guide object 810 and the capture-position icon 820, as illustrated in FIGS. 8A and 8B.

When the guide object 810 and the capture-position icon 820 overlay each other, within a reference range and/or distance, according to the movement of the electronic device, the electronic device may capture an image corresponding to a capture area including the capture-position icon 820.

As illustrated in FIG. 9A, the electronic device may display the guide object 910, having the shape of a Pac-Man, in a predetermined portion of the central area of the preview image 900, and may display at least one of the capture-position icon 920 having the shape of a circle on the display unit 160. The capture-position icon 920 may represent the central coordinates of a capture area for an image used to generate a panoramic image.

The electronic device may display at least one of the sub-capture-position icon 930 between the guide object 910 and an adjacent one of the capture-position icon 920. In this case, the electronic device may control how many sub-capture-position icons 930 are displayed depending on the distance between the guide object 910 and the capture-position icon 920, as illustrated in FIGS. 9A and 9B.

When the guide object 910 and the capture-position icon 920 overlay each other, within a reference range and/or distance, according to the movement of the electronic device, as illustrated in FIG. 9C, the electronic device may capture an image corresponding to a capture area including the capture-position icon 920.

As illustrated in FIG. 10A, the electronic device may display the guide object 1010, having the shape of a key, in an edge of a preview image on the display unit 160, and may display at least one of the capture-position icons 1020-1 to 1020-4 having the shape of a keyhole on the display unit 160. The capture-position icons 1020-1 to 1020-4 may represent the coordinates of edges of a capture area for an image used to generate a panoramic image.

In this case, the electronic device may display the guide object 1010 in the direction of the capture-position icon 1020-1 adjacent to the preview image 1000, from among edges of the preview image 1000.

When the guide object 1010 and the capture-position icon 1020-1 overlay each other, within a reference range and/or distance, according to the movement of the electronic device, as illustrated in FIG. 10B, the electronic device may capture an image corresponding to a capture area including the capture-position icon 1020-1.

Referring to FIG. 11A, the electronic device may display a display area of a preview image in the first shape of the puzzle piece 1100.

When capturing an image corresponding to the display area displayed in the first shape of the puzzle piece 1100, the electronic device may display an adjacent capture position in the second shape of the puzzle piece 1110, corresponding to the first shape of the puzzle piece 1100, as illustrated in FIG. 11B.

When the first shape of the puzzle piece 1100 is connected to the second shape of the puzzle piece 1110, according to the movement of the electronic device, as illustrated in FIG. 11C, the electronic device may capture an image corresponding to an area displayed in the second shape of the puzzle piece 1110.

Referring to FIG. 12A, the electronic device may display a display area of a preview image in the first shape of the puzzle piece 1200.

When capturing an image corresponding to the display area displayed in the first shape of the puzzle piece 1200, the electronic device may display the captured image in the second shape of the puzzle piece 1210, corresponding to the first shape of the puzzle piece 1220, as illustrated in FIG. 12B. In this case, the electronic device may display an image at an adjacent capture position on the first shape of the puzzle piece 1220.

When the first shape of the puzzle piece 1210 is connected to the second shape of the puzzle piece 1220, according to the movement of the electronic device, as illustrated in FIG. 12C, the electronic device may capture an image corresponding to an area displayed in the first shape of the puzzle piece 1220.

Figure 14:
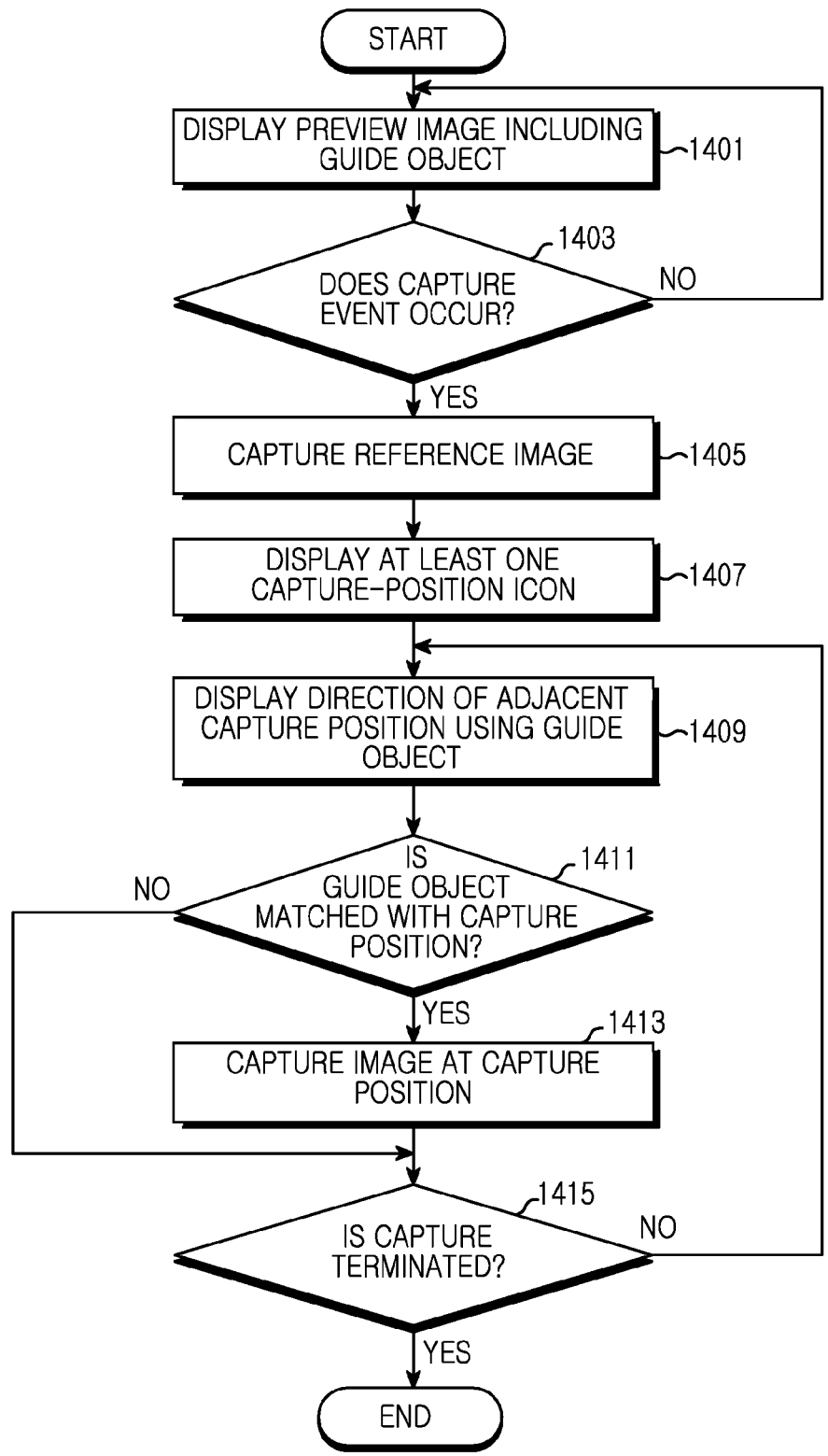
FIG. 14 is a diagram illustrating a process for displaying guide information for image capture in an electronic device according to the first embodiment of the present disclosure.

FIG. 14 illustrates a process for displaying guide information for image capture in an electronic device according to the first embodiment of the present disclosure.

Referring to FIG. 14, in operation 1401, the electronic device may display a preview image including at least one guide object on the display unit 160. For example, the electronic device may display the preview image including the guide object on a portion of the display unit 160. In this case, the electronic device may determine the display color and brightness of the guide object in consideration of the brightness and color of an area of the preview image on which the guide object is displayed.

In operation 1403, the electronic device determines whether a capture event occurs. For example, the electronic device may determine whether a selection of a capture icon, displayed on the display unit 160, is detected. In another example, the electronic device may determine whether an input of the capture button is detected. In still another example, the electronic device may determine whether a gesture mapped to the capture event is detected.

When it is determined, in operation 1403, that the capture event does not occur, may return to operation 1401.

When it is determined, in operation 1403, that the capture event occurs, the electronic device captures a reference image, which may be the preview image, in operation 1405.

In operation 1407, the electronic device displays at least one capture-position icon on the display unit 160 in operation 1407. For example, the electronic device sets at least one capture position for at least one image used to generate a panoramic image in consideration of the position information, for example, the direction of the camera unit 160, of the reference image. Thereafter, the electronic device displays the at least one capture-position icon according to the reference image on the display unit 160.

In operation 1409, the electronic device displays the direction of an adjacent capture position using the guide object. In this case, the electronic device may also display information about a number of images to be captured in the direction indicated by the guide object. For example, the electronic device may display the direction of the adjacent capture position by using the point 412 of the guide object 410, as illustrated in FIG. 4A. For example, the electronic device may display the direction of the adjacent capture position by adjusting the shade or the color of the protruding portion 512 of the guide object 510, as illustrated in FIG. 5A. In another example, the electronic device may display the direction of the adjacent capture position by using the sub-capture-point icon 830 or sub-capture-point icon 930, as respectively illustrated in FIGS. 8A and 9A. In another example, the electronic device may display the direction of the adjacent capture position in the direction indicated by the key, as illustrated in FIG. 10A.

In operation 1411, the electronic device determines whether the guide object is matched with the capture position of the capture position icon, or in other words, determines whether the guide object and the capture-position icon overlay each other within a reference range and/or distance according to movement of the electronic device. In this case, the electronic device may continuously display the preview image including the guide object according to movement of the electronic device and/or may display the preview image only at a time when the guide object and the capture-position icon overlay each other, within a reference range and/or distance, according to movement of the electronic device.

When it is determined, in operation 1411, that the guide object and the capture-position icon do not overlay each other within the reference range and/or distance, the electronic device determines whether capture is terminated in operation 1415.

When it is determined, in operation 1411, that the guide object and the capture-position icon overlay each other within the reference range and/or distance, the electronic device captures an image a capture position, corresponding to a capture area including the capture-position icon, in operation 1413. In this case, the electronic device may project the captured image onto a two-dimensional projection model and/or a three-dimensional projection model for generating a panoramic image.

In operation 1415, the electronic device determines whether the capture is terminated.

When the capture is not terminated, the electronic device displays the direction of an adjacent capture position using the guide object in operation 1409.

When the capture is terminated, the electronic device may end the procedure described with reference to FIG. 14.

In the above-described embodiment, the electronic device may also display information about the number of images which are to be captured in the direction indicated by the guide object when the direction of the adjacent capture position is indicated using the guide object.

In another embodiment, the electronic device may display information about the number of images which are to be captured in respective directions for image acquirement associated with a panoramic image using the guide object.

Figure 15:
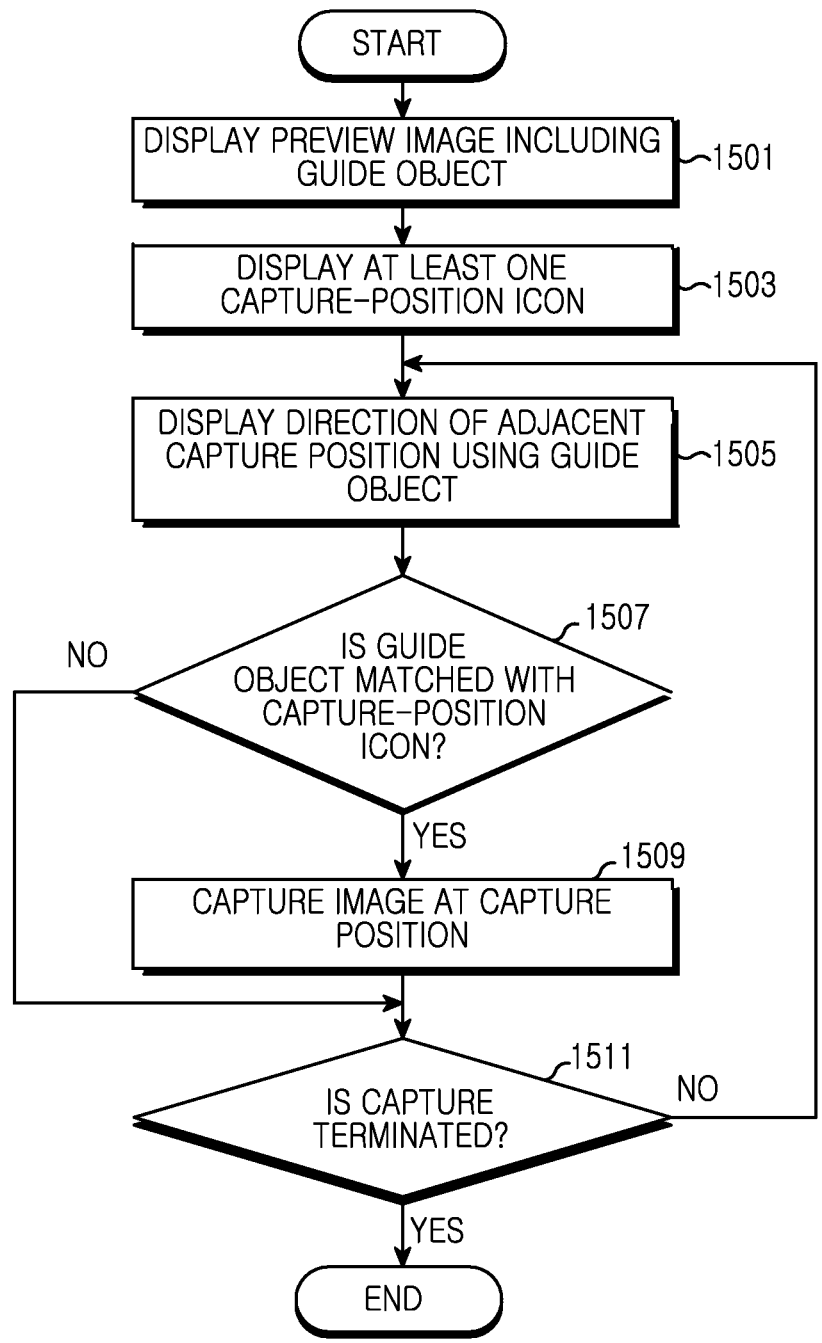
FIG. 15 is a diagram illustrating a process for displaying guide information for image capture in an electronic device according to the second embodiment of the present disclosure.

FIG. 15 illustrates a process for displaying guide information for image capture in an electronic device according to a second embodiment of the present disclosure.

Referring to FIG. 15, in operation 1501, the electronic device may display a preview image including at least one guide object on the display unit 160. For example, the electronic device may display the preview image including the guide object on a portion of the display unit 160. In this case, the electronic device may determine the display color and brightness of the guide object in consideration of the brightness and color of an area of the preview image on which the guide object is displayed.

In operation 1503, the electronic device displays at least one capture-position icon on the display unit 160. For example, the electronic device sets at least one capture position for at least one image used to generate a panoramic image in consideration of the movement information, for example, the direction of the camera unit 160, of the electronic device at a time of displaying the preview image. Thereafter, the electronic device displays at least one capture-position icon according to the reference image on the display unit 160.

In operation 1505, the electronic device displays a direction of an adjacent capture position using the guide object. In this case, the electronic device may also display information about the number of images to be captured in the direction indicated by the guide object. For example, the electronic device may display the direction of the adjacent capture position by using the point 412 of the guide object 410, as illustrated in FIG. 4A. For example, the electronic device may display the direction of the adjacent capture position by adjusting the shade or color of the protruding portion 512 of the guide object 510, as illustrated in FIG. 5A. In another example, the electronic device may display the direction of the adjacent capture position by using at least one of the sub-capture-point icons 830 or 930, as respectively illustrated in FIGS. 8A and 9A. In another example, the electronic device may display the direction of the adjacent capture position in the direction indicated by the key, as illustrated in FIG. 10A.

In operation 1507, the electronic device determines whether the guide object is matched with the capture-position icon, or, in other words, determines whether the guide object and the capture-position icon overlay each other, within a reference range and/or distance, according to movement of the electronic device. In this case, the electronic device may continuously display the preview image, including the guide object, according to movement of the electronic device and/or display the preview image only at a time when the guide object and the capture-position icon overlay each other, within a reference range and/or distance, according to movement of the electronic device.

When the electronic device, in operation 1507, determines that the guide object and the capture-position icon do not overlay each other within the reference range and/or distance, the electronic device determines whether capture is terminated in operation 1511.

When the electronic device, in operation 1507, determines that the guide object and the capture-position icon overlay each other within the reference range and/or distance, the electronic device captures an image at a capture position corresponding to a capture area including the capture-position icon in operation 1509. In this case, the electronic device may project the captured image onto a two-dimensional projection model and/or three-dimensional projection model for generating a panoramic image.

In operation 1511, the electronic device determines whether the capture is terminated.

When the capture is not terminated, the electronic device displays the direction of an adjacent capture position using the guide object in operation 1505.

When the capture is terminated, the electronic device may end the procedure described with reference to FIG. 15.

In the embodiment of FIG. 15, the electronic device may also display information about the number of images which are to be captured in the direction indicated by the guide object when the direction of the adjacent capture position is indicated using the guide object.

According to an embodiment of the present disclosure, the electronic device may display information about the number of images which are to be captured in respective directions for image acquirement associated with a panoramic image using the guide object.

In the embodiment of FIG. 15, the electronic device may display the guide object and capture position information on the display unit 160 for generation of a panoramic image.

Figure 16:
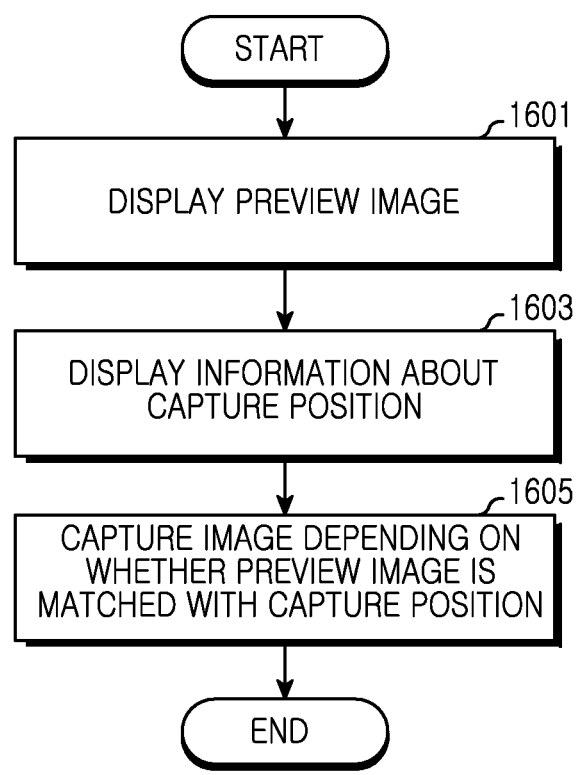
FIG. 16 is a diagram illustrating a process for capturing an image in an electronic device according to the second embodiment of the present disclosure.

According to an embodiment of the present disclosure, the electronic device may also display only the capture position information on the display unit 160 for generation of a panoramic image, as illustrated in FIG. 16.

FIG. 16 illustrates a process for capturing an image in an electronic device according to a second embodiment of the present disclosure.

Referring to FIG. 16, in operation 1601, the electronic device may display a preview image, acquired through the camera unit 130, on the display unit 160. In this case, the electronic device may display the preview image in a portion of the display unit 160.

In operation 1603, the electronic device may display information about at least one capture position for at least one image used to generate a panoramic image on the display unit 160. For example, when the movement of the electronic device is detected, the electronic device may display a contour of an adjacent capture area in the direction of the movement.

When the capture position information is displayed, the electronic device may capture an image, such as the preview image, according to whether the preview image is matched with the capture position, in operation 1605, or in other words, the electronic device may capture the preview image at a time when the preview image is matched with the capture position information in operation 1605.

For example, the electronic device may display the capture position information on the display unit 160, as illustrated in FIGS. 13A to 13E.

Referring to FIG. 13A, the electronic device displays a preview image 1300 with a contour of a first color. In this case, the first color may include white. In addition, the electronic device may display configuration information 1310 of all images used to generate a panoramic image on a portion of the display unit 160.

When the capture event occurs, the electronic device changes the color of the contour of the preview image into a second color and captures the preview image while displaying a blur effect with respect to the second color, as illustrated in FIG. 13B. In addition, the electronic device may display a circle 1320, indicating that image processing is being performed, in a predetermined region of the central area of a captured image. In this case, the second color may include blue which is different from the first color.

In the case of capturing an image, the electronic device displays a directions 1330, in which the electronic device may move for image capture, as illustrated in FIG. 13C. In this case, the electronic device may display only the direction in which an image to be captured exists.

When the movement of the electronic device is detected, the electronic device may display information 1340, about the direction of the movement of the electronic device, and the contour 1350 for capture of a next image in the direction of the movement of the electronic device as illustrated in FIG. 13D. In this case, the electronic device may display the contour 1350 for image capture using a contour of a second color.

Figure 13E:
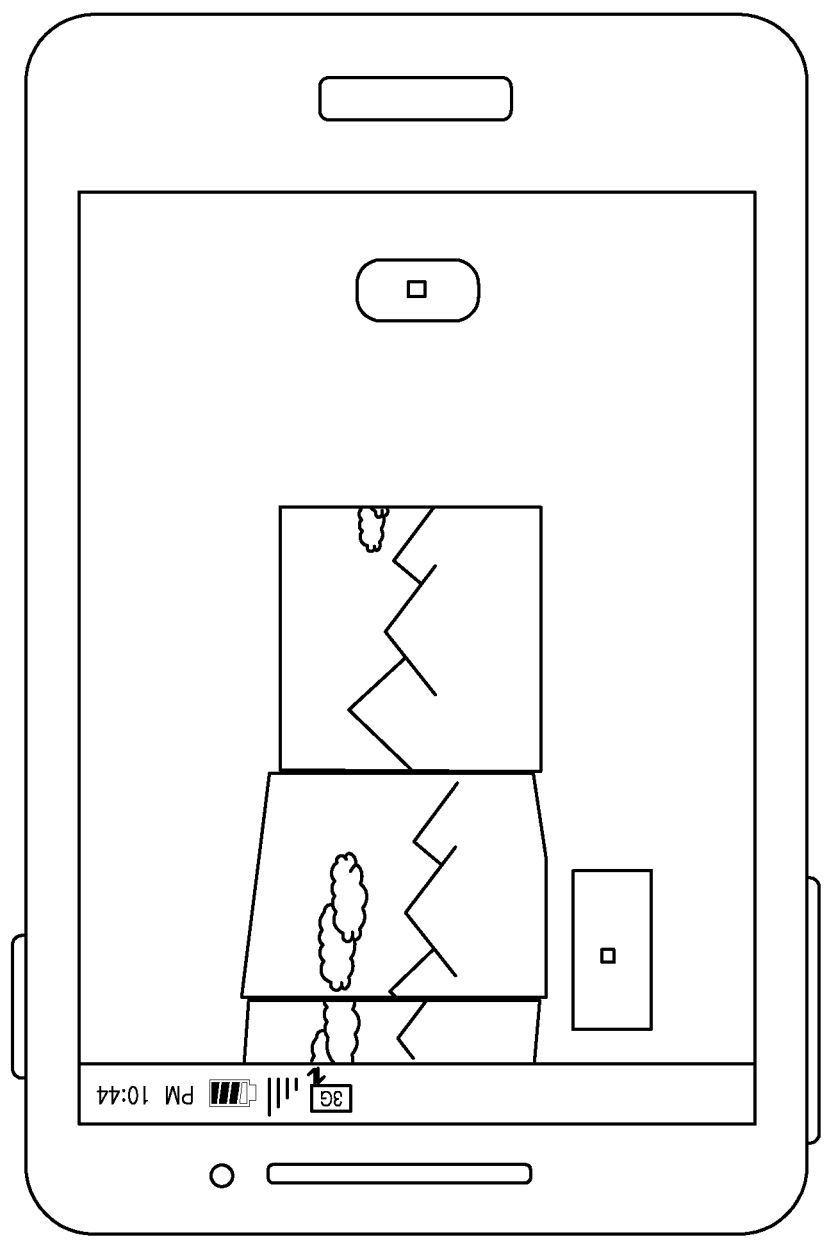

As illustrated in FIG. 13E, when the preview image overlays the contour 1350 for capture according to movement of the electronic device, the electronic device may capture an image included in the capture area.

Figure 17:
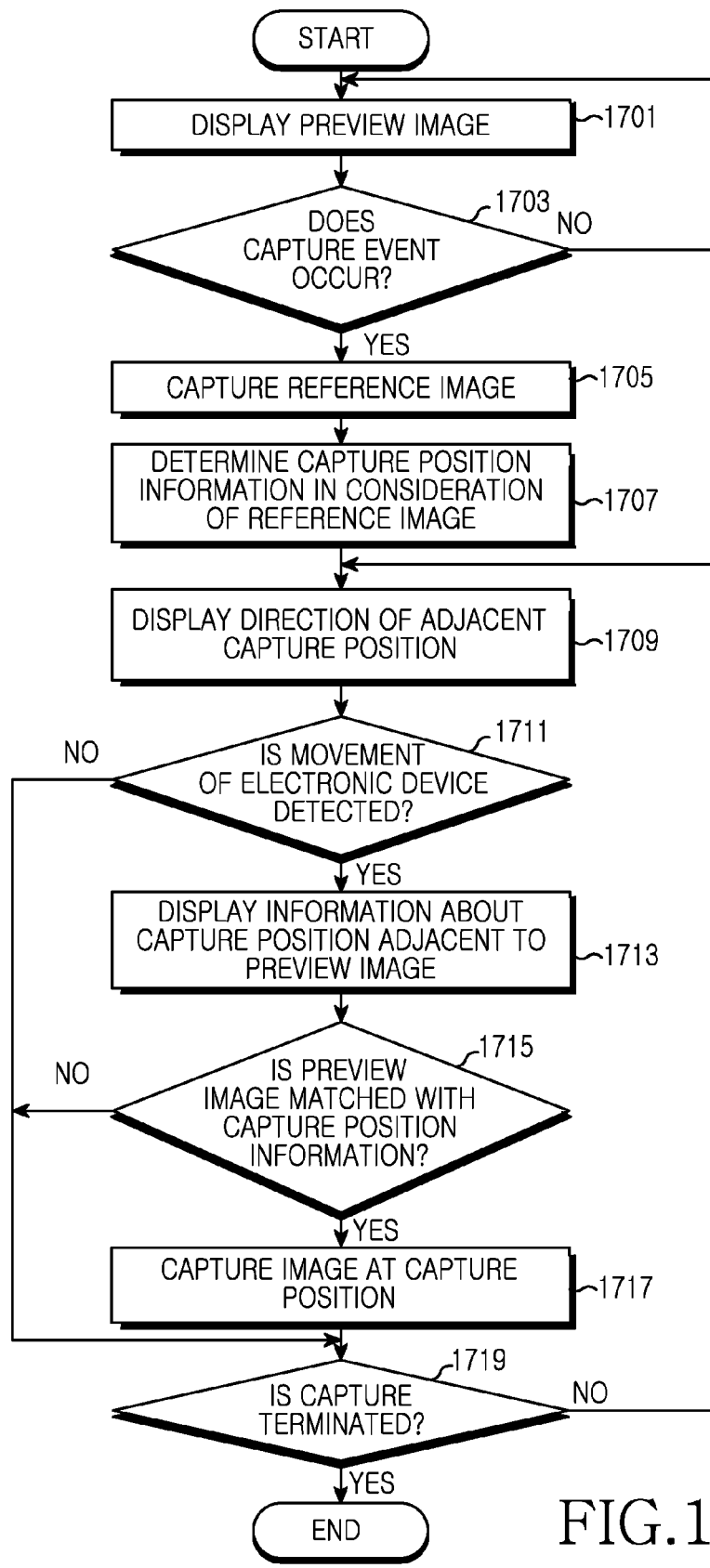
FIG. 17 is a diagram illustrating a process for displaying guide information for image capture in an electronic device according to the third embodiment of the present disclosure.

FIG. 17 illustrates a process for displaying guide information for image capture in an electronic device according to a third embodiment of the present disclosure.

Referring to FIG. 17, in operation 1701, the electronic device may display a preview image on the display unit 160. For example, the electronic device may display the preview image in a portion of the display unit 160.

In operation 1703, the electronic device determines whether a capture event occurs. For example, the electronic device may determine whether a selection of a capture icon displayed on the display unit 160 is detected. In another example, the electronic device may determine whether an input of the capture button is detected. In still another example, the electronic device may determine whether a gesture mapped to the capture event is detected.

When, in operation 1703, the electronic device determines that the capture event does not occur, the electronic device may display the preview image on the display unit 160, and may return to operation 1701.

When, in operation 1703, the electronic device determines that the capture event occurs, the electronic device captures a reference image, which may be the preview image, in operation 1705.

In operation 1707, the electronic device determines capture position information in consideration of the reference image, or in other words, the electronic device sets at least one capture positions for at least one image used to generate a panoramic image in consideration of the position information, for example, the direction of the camera unit 160, of the reference image.

In operation 1709, the electronic device displays a direction of an adjacent capture position, or in other words, the electronic device displays at least one direction in which image capture is possible. For example, the electronic device displays at least one of the directions 1330 in which the electronic device may move for image capture, as illustrated in FIG. 13C. In this case, the electronic device may display only the direction in which an image to be captured exists.

Thereafter, in operation 1711, the electronic device determines whether movement of the electronic device is detected.

When, in operation 1711, the electronic device determines that the movement of the electronic device is not detected, the electronic device determines whether capture is terminated in operation 1719.

When, in operation 1711, the electronic device determines that the movement of the electronic device is detected, the electronic device may display information about a capture position adjacent to the preview image in operation 1713, or, in other words, the electronic device may display information about capture areas located in the direction of the movement of the electronic device on the display unit 160, in operation 1713. The electronic device may display information 1340 about the direction of the movement of the electronic device and an area 1350 for capture of a next image in the direction of the movement of the electronic device, as illustrated in FIG. 13D.

In operation 1715, the electronic device determines whether the preview image is matched with the capture position information, or in other words, the electronic device determines whether the preview image overlays the contour of the capture area according to movement of the electronic device. In this case, the electronic device may continuously display the preview image, including the guide object, according to movement of the electronic device.

When the electronic device, in operation 1715, determines that the preview image does not overlay the contour of the capture area according to movement of the electronic device, the electronic device determines whether capture is terminated in operation 1719.

When the electronic device, in operation 1715, determines that the preview image overlays the contour of the capture area according to movement of the electronic device, the electronic device captures an image at the capture position included in the capture area in operation 1717. In this case, the electronic device may project the captured image onto a two-dimensional projection model and/or three-dimensional projection model for generating a panoramic image.

In operation 1719, the electronic device determines whether the capture is terminated.

When the capture is not terminated, the electronic device displays at least one direction in which image capture is possible, in operation 1709. For example, the electronic device displays at least one of the directions 1330 in which the electronic device may move for image capture, as illustrated in FIG. 13C. In this case, the electronic device may display only the direction in which an image to be captured exists.

When capture is terminated, the electronic device may end the procedure described with reference to FIG. 17.

Figure 18:
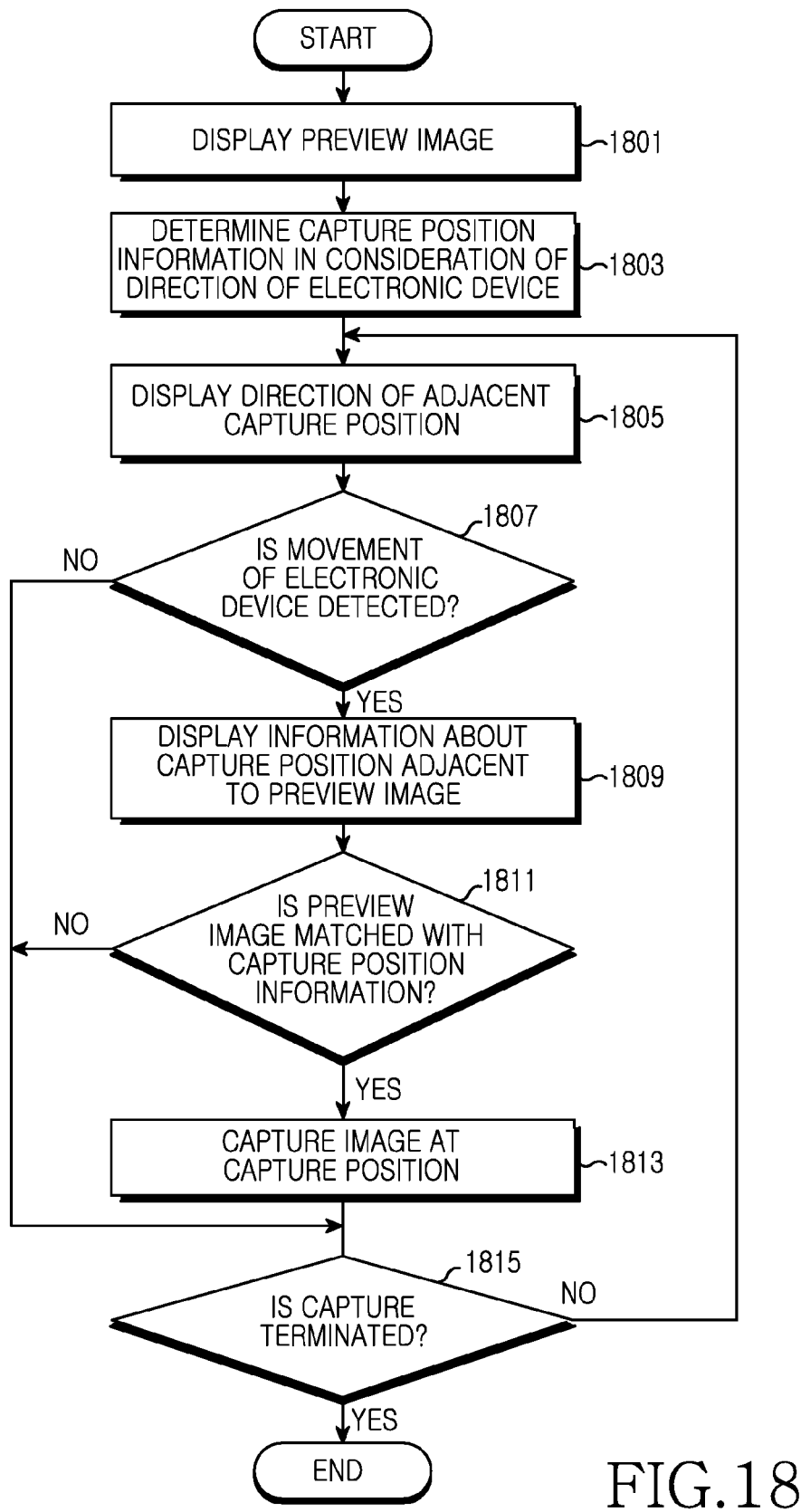
FIG. 18 is a diagram illustrating a process for displaying guide information for image capture in an electronic device according to the fourth embodiment of the present disclosure.

FIG. 18 illustrates a process for displaying guide information for image capture in an electronic device according to a fourth embodiment of the present disclosure.

Referring to FIG. 18, in operation 1801, the electronic device may display a preview image on the display unit 160. For example, the electronic device may display the preview image in a portion of the display unit 160.

In operation 1803, the electronic device determines capture position information in consideration of a direction of the electronic device, or, in other words, the electronic device sets at least one capture position for at least one image used to generate a panoramic image in consideration of the movement information, for example, the direction of the camera unit 160, of the electronic device at a time of displaying the preview image.

In operation 1805, the electronic device displays at least one direction of an adjacent capture position in which image capture is possible. For example, the electronic device displays a direction 1330 in which the electronic device may move for image capture, as illustrated in FIG. 13C. In this case, the electronic device may display only the direction in which an image to be captured exists.

Thereafter, in operation 1807, the electronic device determines whether movement of the electronic device is detected.

When the electronic device, in operation 1807, determines that the movement of the electronic device is not detected, the electronic device determines whether capture is terminated in operation 1815.

When the electronic device, in operation 1807, determines that the movement of the electronic device is detected, the electronic device may display information about a capture position adjacent to the preview image, or in other words, information about capture areas located in the direction of the movement of the electronic device on the display unit 160, in operation 1809. The electronic device may display information 1340, about the direction of the movement of the electronic device, and an area 1350 for capture of a next image in the direction of the movement of the electronic device, as illustrated in FIG. 13D.

In operation 1811, the electronic device determines whether the preview image is matched with the capture position information, or, in other words, the electronic device determines whether the preview image overlays the contour of the capture area according to movement of the electronic device. In this case, the electronic device may continuously display the preview image, including the guide object, according to movement of the electronic device.

When the electronic device, in operation 1811, determines that the preview image does not overlay the contour of the capture area according to movement of the electronic device, the electronic device determines whether capture is terminated in operation 1815.

When the electronic device, in operation 1811, determines that the preview image overlays the contour of the capture area according to movement of the electronic device, the electronic device captures an image at a capture position included in the capture area in operation 1813. In this case, the electronic device may project the captured image onto a two-dimensional projection model and/or three-dimensional projection model for generating a panoramic image.

In 1815, the electronic device determines whether the capture is terminated.

When the capture is not terminated, the electronic device displays at least one direction in which image capture is possible in operation 1805. For example, the electronic device displays at least one of the directions 1330 in which the electronic device may move for image capture, as illustrated in FIG. 13C. In this case, the electronic device may display only the direction in which an image to be captured exists.

When the capture is terminated, the electronic device may end the procedure described with reference to FIG. 18.

As described above, the electronic device displays information about capture directions of images for configuration of a panoramic image and information about adjacent capture positions in the capture direction of an image sensor, thereby acquiring a plurality of images for configuration of a panoramic image.

In addition, the electronic device displays information about the number of images to be captured for a panoramic image for each capture direction, thereby configuring the panoramic image.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   displaying a preview image;
   capturing at least a portion of the preview image as a first image;
   displaying a first object in the preview image at a first position on a display unit of the electronic device;
   displaying at least one second object at a second position on the display unit;
   displaying at least one of a direction or a position of the at least one second object using the first object;
   changing the preview image based on movement of the electronic device; and
   capturing at least a portion of the changed preview image when the at least one first object is located within a predetermined distance from the at least one second object based on the movement of the electronic device,
   wherein the displaying of the at least one of the direction or the position of the at least one second object comprises displaying at least one of the direction or the position by using at least one of a shape, color, size, or transparency of the first object.

2. The method of claim 1, wherein the first object is displayed at a central area of the preview image.

3. The method of claim 1, wherein the displaying of the at least one second object comprises displaying the at least one second object in at least one of a square shape and a honeycomb shape.

4. The method of claim 1, wherein the displaying of the first object comprises:
   identifying a color of an area in which the first object is displayable in the preview image,
   determining a color of the first object in consideration of the color of the area in which the first object is displayable, and
   displaying the first object having the determined color.

5. The method of claim 1, wherein the first object includes information about a number of images which are to be captured in at least one direction.

6. The method of claim 1, wherein the displaying of the at least one second object comprises displaying the at least one second object indicating a position for image capture in a direction of movement of the electronic device when the movement of the electronic device is detected.

7. A method in an electronic device, the method comprising:
   displaying a first image at a first position on a display unit of the electronic device;
   detecting movement of the electronic device after the displaying of the first image;
   displaying an object and a visual indication associated with a direction of movement of the electronic device at a second position of the display unit according to a direction of the movement of the electronic device;
   displaying at least one of a direction or a position of the object using the first image;
   changing the first image based on movement of the electronic device; and
   capturing at least a portion of the first image when the first image is located within a predetermined distance from the object based on the movement of the electronic device; wherein the displaying of the at least one of the direction or the position of the object comprises displaying at least one of the direction or the position by using at least one of a shape, color, size, or transparency of the first image.

8. The method of claim 7, further comprising displaying at least one direction in which the electronic device is moveable for image capture after the displaying of the first image.

9. The method of claim 7, wherein the object includes a contour of an area for image capture.

10. An electronic device comprising:
a display unit;
a camera module; and
a processor configured to control to:
display a preview image,
capture at least a portion of the preview image as a first image through the camera module;
display a first object in the preview image at a first position on the display unit;
display at least one second object at a second position on the display unit;
display at least one of a direction or a position of the at least one second object using the first object;
change the preview image based on movement of the electronic device; and
capture at least a portion of the changed preview image through the camera module when the at least one first object is located within a predetermined distance from the at least one second object based on the movement of the electronic device,
wherein the processor is further configured to control to display the at least one of the direction or the position by using at least one of a shape, color, size, or transparency of the at least one first object.

11. The electronic device of claim 10, wherein the first object is displayed at a central area of the preview image.

12. The electronic device of claim 10, wherein the processor is further configured to control to display the at least one second object in at least one of a square shape or a honeycomb shape.

13. The electronic device of claim 10, wherein the processor is further configured to control to:
identify a color of an area in which the first object is displayable in the preview image;
determine a color of the first object in consideration of the color of the area in which the first object is displayable; and
display the first object having the determined color.

14. The electronic device of claim 10, wherein the first object includes information about a number of images which are to be captured in at least one direction.

15. The electronic device of claim 10, wherein the processor is further configured to control to display the at least one second object indicating a position for image capture in a direction of movement of the electronic device when the movement of the electronic device is detected.

16. An electronic device comprising:
a display unit;
a camera module; and
a processor configured to control to:
display a first image at a first position on the display unit;
detect movement of the electronic device after the displaying of the first image;
display an object and a visual indication associated with a direction of movement of the electronic device at a second position of the display unit according to a direction of the movement of the electronic device; displaying at least one of a direction or a position of the object using the first image;
change the first image based on movement of the electronic device; and
capture at least a portion of the first image through the camera module when the first image is located within a predetermined distance from the object based on the movement of the electronic device; wherein the displaying of the at least one of the direction or the position of the object comprises displaying at least one of the direction or the position by using at least one of a shape, color, size, or transparency of the first image.

17. The electronic device of claim 16, wherein the processor is further configured to control to display at least one direction in which the electronic device is moveable for image capture after the displaying of the first image.

18. The electronic device of claim 16, wherein the object includes a contour of an area for image capture.

* * * * *